(12) United States Patent
Nakao et al.

(10) Patent No.: US 8,351,538 B2
(45) Date of Patent: Jan. 8, 2013

(54) RADIO TRANSMISSION DEVICE AND RADIO TRANSMISSION METHOD

(75) Inventors: Seigo Nakao, Kadoma (JP); Daichi Imamura, Kadoma (JP); Yoshihiko Ogawa, Kadoma (JP); Atsushi Matsumoto, Sendai (JP); Katsuhiko Hiramatsu, Leuven (BE)

(73) Assignee: Panasonic Corporation, Osaka (JP)

( * ) Notice: Subject to any disclaimer, the term of this patent is extended or adjusted under 35 U.S.C. 154(b) by 365 days.

(21) Appl. No.: 12/673,000

(22) PCT Filed: Aug. 12, 2008

(86) PCT No.: PCT/JP2008/002197
§ 371 (c)(1),
(2), (4) Date: Feb. 10, 2010

(87) PCT Pub. No.: WO2009/022464
PCT Pub. Date: Feb. 19, 2009

(65) Prior Publication Data
US 2011/0286543 A1 Nov. 24, 2011

(30) Foreign Application Priority Data

Aug. 13, 2007 (JP) .................. 2007-211101
Oct. 29, 2007 (JP) .................. 2007-280797

(51) Int. Cl.
*H04L 27/00* (2006.01)

(52) U.S. Cl. ........ 375/295; 370/208; 370/203; 370/329; 714/749

(58) Field of Classification Search .................. 375/295, 375/130, 260; 370/344, 329; 714/749, 740
See application file for complete search history.

(56) References Cited

U.S. PATENT DOCUMENTS

| | | | |
|---|---|---|---|
| 7,668,078 B2 * | 2/2010 | Balasubramanian et al. | 370/209 |
| 7,929,415 B2 * | 4/2011 | Kwak et al. | 370/208 |
| 7,957,317 B2 * | 6/2011 | Frederiksen et al. | 370/252 |
| RE42,675 E * | 9/2011 | You et al. | 370/209 |

(Continued)

FOREIGN PATENT DOCUMENTS

WO 2008/053930 A1 5/2008

OTHER PUBLICATIONS

European Search Report dated Sep. 15, 2011.

(Continued)

*Primary Examiner* — David Ometz
*Assistant Examiner* — Bahman Badipour
(74) *Attorney, Agent, or Firm* — Seed IP Law Group PLLC

(57) ABSTRACT

It is possible to improve the CQI reception performance even when a delay is caused in a propagation path, a transmission timing error is caused, or a residual interference is generated between cyclic shift amounts of different ZC sequences. For the second symbol and the sixth symbol of the ACK/NACK signal which are multiplexed by RS of CQI, (+, +) or (−, −) is applied to a partial sequence of the Walsh sequence. For RS of CQI transmitted from a mobile station, + is added as an RS phase of the second symbol and − is added as an RS phase of the sixth symbol. A base station (100) receives multiplexed signals of ACK/NACK signals and CQI signals transmitted from a plurality of mobile stations. An RS synthesis unit (119) performs synthesis by aligning the RS phase of CQI.

16 Claims, 17 Drawing Sheets

U.S. PATENT DOCUMENTS

| | | | |
|---|---|---|---|
| 2003/0063588 A1* | 4/2003 | Lee et al. | 370/335 |
| 2008/0075184 A1* | 3/2008 | Muharemovic et al. | 375/260 |
| 2008/0316957 A1* | 12/2008 | Shen et al. | 370/328 |
| 2008/0316961 A1* | 12/2008 | Bertrand et al. | 370/329 |
| 2009/0022135 A1* | 1/2009 | Papasakellariou et al. | 370/344 |
| 2009/0034505 A1* | 2/2009 | Papasakellariou et al. | 370/344 |
| 2009/0316811 A1* | 12/2009 | Maeda et al. | 375/260 |
| 2010/0067461 A1* | 3/2010 | Kwak et al. | 370/329 |
| 2010/0135273 A1* | 6/2010 | Kim | 370/344 |
| 2011/0080876 A1* | 4/2011 | Yin | 370/329 |
| 2011/0080880 A1* | 4/2011 | Yin et al. | 370/329 |
| 2012/0008585 A1* | 1/2012 | Kwon et al. | 370/329 |

OTHER PUBLICATIONS

3GPP TSG RAN WG1 Meeting #49bis, "Optimum RS Structure for Uplink L1/L2 Control Channel in E-UTRA," NTT DoCoMo, R1-072952, Jun. 25-29, 2007, pp. 1-7.

A. Ghosh, et al., "Uplink Control Channel Design for 3GPP LTE," IEEE International Symposium on Personal, Indoor and Mobile Radio Communications, 2007, pp. 1-5.

3GPP TSG RAN WG1 #49, "Transmission of Downlink CQI in E-UTRA Uplink," Kobe, R1-072212, May 7-11, 2007, pp. 1-5.

KDDI, "Scrambling Code for L1/L2 Control Channel with CDM Based Multiplexing in E-UTRA Downlink," Report R1-062945, 3rd Generation Partnership Project (3GPP™) TSG RAN WG1 Meeting #46bis, Seoul, Oct. 9-13, 2006, pp. 1-4.

International Search Report, mailed Nov. 18, 2008, issued in corresponding International Application No. PCT/JP2008/002197, filed Aug. 12, 2008.

Nokia Siemens Networks, Nokia, "Multiplexing Capability of CQIs and ACK/NAKCs from different UEs," Report R1-072315, 3rd Generation Partnership Project (3GPP™) TSG RAN WG1 Meeting #49, Kobe, Japan, May 7-11, 2007, pp. 1-4.

NTT DoCoMo et al., "CDM-Based Multiplexing Method of Multiple ACK/NACK and CQI for E-UTRA Uplink," Report R1-062742, 3rd Generation Partnership Project (3GPP™) TSG RAN WG1 Meeting #46bis, Seoul, Oct. 9-13, 2006, pp. 1-6.

Panasonic, "Commonality on the Cyclic Shift Hopping Patterns of ACK/NACK and CQI on PUCCH," Report R1-074901, 3rd Generation Partnership Project (3GPP™) TSG RAN WG1 Meeting #51, Jeju, South Korea, Nov. 5-9, 2007, pp. 1-2.

Panasonic, "Cyclic Shift Hopping Pattern for Uplink ACK/NACK," Report R1-074411, 3rd Generation Partnership Project (3GPP™) TSG RAN WG1 Meeting #50bis, Shanghai, Oct. 8-12, 2007, pp. 1-6.

Panasonic, "Signaling Parameters for UL ACK/NACK Resources," Report R1-073616, 3rd Generation Partnership Project (3GPP™) TSG RAN WG1 Meeting #50, Athens, Aug. 20-24, 2007, pp. 1-3.

Panasonic, "Variable Phase Definition of the Reference Signal for CQI in PUCCH," Report R1-073621, 3rd Generation Partnership Project (3GPP™) TSG RAN WG1 Meeting #50, Athens, Aug. 20-24, 2007, pp. 1-5.

* cited by examiner

RADIO TRANSMISSION DEVICE AND RADIO TRANSMISSION METHOD

TECHNICAL FIELD

The present invention relates to a radio transmitting apparatus and radio transmitting method.

BACKGROUND ART

Mobile communication applies ARQ (Automatic Repeat reQuest) to downlink data from a wireless communication base station apparatus (hereinafter abbreviated as "base station") to a wireless communication mobile station apparatus (hereinafter abbreviated as "mobile station). That is, the mobile station feeds back an ACK/NACK signal showing an error detection result of downlink data to the base station. The mobile station performs a CRC check of downlink data, and, if CRC=OK (i.e. no error), feeds back an ACK (Acknowledgement) to the base station, or, if CRC=NG (i.e. error present), feeds back a NACK (Negative Acknowledgement) to the base station. This ACK/NACK signal is transmitted to the base station using an uplink control channel such as a PUCCH (Physical Uplink Control Channel).

Further, the base station transmits control information for indicating a downlink data resource allocation result, to the mobile station. This control information is transmitted to the mobile station using a downlink control channel such as L1/L2CCHs (L1/L2 Control Channels). Each L1/L2CCH occupies one or a plurality of CCEs (Control Channel Elements). In case where one L1/L2CCH occupies a plurality of CCEs, one L1/L2CCH occupies a plurality of consecutive CCEs. According to the number of CCEs required to report control information, the base station allocates one of a plurality of L1/L2CCHs, to each mobile station, and maps control information on the physical resources associated with the CCEs occupied by each L1/L2CCH and transmits control information.

Further, to associate CCEs and PUCCHs for efficient use of downlink communication resources is being studied. According to this association, each mobile station can decide the PUCCH number to use to transmit an ACK/NACK signal from each mobile station, based on the CCE number associated with the physical resources in which that control information for that mobile station is mapped.

Further, as shown in FIG. 1, to code-multiplex a plurality of ACK/NACK signals from a plurality of mobile stations by spreading using ZC (Zadoff-Chu) sequences and Walsh sequences (see Non-Patent Document 1) is being studied. Note that the sequence length of a pure ZC sequence is a prime number, and therefore a pseudo ZC sequence of a sequence length of 12 is generated by cyclically extending part of the ZC sequence of a sequence length of 11. Also, note that a pseudo ZC sequence will also be referred to as a "ZC sequence" below for ease of explanation. In FIG. 1, ($W_0$, $W_1$, $W_2$ and $W_3$) represents a Walsh sequence of a sequence length of 4. As shown in FIG. 1, a mobile station first performs first spreading of an ACK or NACK in an SC-FDMA symbol using a ZC sequence (having a sequence length of 12) in the frequency domain.

Next, the ACK/NACK signal after the first spreading is subjected to an IFFT (Inverse Fast Fourier Transform) according to $W_0$ to $W_3$. The ACK/NACK signal spread using a ZC sequence of a sequence length of 12 in the frequency domain is transformed into a ZC sequence of a sequence length of 12 in the time domain by this IFFT. Then, the signal after the IFFT is further subjected to second spreading using the Walsh sequence (having a sequence length of 4). That is, one ACK/NACK signal is mapped over four SC-FDMA symbols. Similarly, other mobile stations spread ACK/NACK signals using ZC sequences and Walsh sequences.

Note that different mobile stations use ZC sequences of different cyclic shift amounts in the time domain or different Walsh sequences. Here, the sequence length of the ZC sequence in the time domain is 12, so that it is possible to use twelve ZC sequences with cyclic shift amounts of 0 to 11 generated from the same ZC sequence. Further, the sequence length of a Walsh sequence is 4, so that it is possible to use four different Walsh sequences. Consequently, it is possible to code-multiplex ACK/NACK signals from maximum 48 (12× 4) mobile stations in the ideal communication environment.

ACK/NACK signals from other mobile stations are spread using ZC sequences of different cyclic shift amounts or different Walsh sequences, so that the base station can separate ACK/NACK signals from mobile stations by performing despreading using a Walsh sequence and correlation processing of ZC sequences. Further, as shown in FIG. 1, block spreading codes of a sequence length of 3 is used for RSs (Reference Signals). That is, RSs from different mobile stations are code-multiplexed using second spreading sequences of a sequence length of 3. By this means, RS components are transmitted over three SC-FDMA symbols.

Here, the cross-correlation between ZC sequences of different cyclic shift amounts generated from the same ZC sequence is virtually 0. Consequently, in the ideal communication environment, as shown in FIG. 2, a plurality of ACK/NACK signals code-multiplexed using ZC sequences of different cyclic shift amounts (cyclic shift amounts of 0 to 11) can be separated in the time domain by correlation processing in the base station without inter-code interference.

However, due to various influences such as transmission timing lags in mobile stations, multipath delay waves and frequency offset, a plurality of ACK/NACK signals from a plurality of mobile stations do not always arrive at the base station at the same time. For example, as shown in FIG. 3, in case where the transmission timing for an ACK/NACK signal spread using a ZC sequence of a cyclic shift amount of 0 is delayed from the right transmission timing, the correlation peak of the ZC sequence of a cyclic shift amount of 0 appears in the detection window for the ZC sequence of a cyclic shift amount of 1. Further, as shown in FIG. 4, in case where an ACK/NACK signal spread using a ZC sequence of a cyclic shift amount of 0 produces a delay wave, interference due to this delay wave leaks and appears in the detection window for the ZC sequence of a cyclic shift amount of 1. That is, in these cases, the ZC sequence of a cyclic shift amount of 0 interferes with the ZC sequence of a cyclic shift amount of 1. Therefore, in these cases, performance of separating an ACK/NACK signal spread using a ZC sequence of a cyclic shift amount of 0 and an ACK/ANCK signal spread using a ZC sequence of a cyclic shift amount of 1 deteriorates. That is, if ZC sequences of consecutive cyclic shift amounts are used, there is a possibility that the performance of separating ACK/NACK signals deteriorates. To be more specific, although there is a possibility that interference due to transmission timing lags occurs together with interference from a cyclic shift amount of 1 to a cyclic shift amount of 0 and interference from a cyclic shift amount of 0 to a cyclic shift amount of 1, as shown in the figure, the influence of a delay wave only produces interference from a cyclic shift amount of 0 to a cyclic shift amount of 1.

Therefore, conventionally, in case where a plurality of ACK/NACK signals are code-multiplexed by spreading using ZC sequences, enough cyclic shift amount differences (i.e. cyclic shift intervals) are provided between ZC sequences to prevent inter-code interference from occurring between ZC sequences. For example, assuming that the difference in the cyclic shift amount between ZC sequences is 2, ZC sequences of six cyclic shift amounts of 0, 2, 4, 6, 8 and 10 in twelve cyclic shift amounts of 0 to 11 are used for first spreading of ACK/NACK signals. Consequently, in case where ACK/NACK signals are subjected to second spreading using Walsh sequences of a sequence length of 4, it is possible to code-multiplex ACK/NACK signals from maximum 24 (6×4) mobile stations. However, there are only three patterns of RS phases, and therefore only ACK/NACK signals from 18 mobile stations can actually be multiplexed.

Non-Patent Document 1: "Multiplexing capability of CQIs and ACK/NACKs form different UEs," 3GPP TSG RAN WG1 Meeting #49, R1-072315, Kobe, Japan, May 7-11, 2007

DISCLOSURE OF INVENTION

Problems to be Solved by the Invention

By the way, in a PUCCH of 3GPP LTE, not only the above-described ACK/NACK signals but also CQI (Channel Quality Indicator) signals are multiplexed. While an ACK/NACK signal is one symbol of information as shown in FIG. 1, a CQI signal is five symbols of information. As shown in FIG. 5, a mobile station spreads a CQI signal using a ZC sequence of a sequence length of 12 and a cyclic shift amount of P, and performs an IFFT of the spread CQI signal and transmits the CQI signal. In this way, Walsh sequences are not applicable to CQI signals and therefore the Walsh sequences cannot be used to separate an ACK/NACK signal and CQI signal. In this case, by using ZC sequences to despread an ACK/NACK signal and CQI signal spread using ZC sequences associated with different cyclic shifts, the base station can separate the ACK/NACK signal and the CQI signal with little inter-code interference.

However, although, in the ideal communication environment, a base station can separate an ACK/NACK signal and CQI signal using ZC sequences, cases might occur depending on, for example, the condition of delay on channels as described above where the orthogonality of cyclic shift sequences breaks and a CQI signal is interfered from an ACK/NACK signal. Further, when despreading is performed using ZC sequences to separate a CQI signal from an ACK/NACK signal, a little inter-code interference from the ACK/NACK signal remains. As shown from FIG. 1 and FIG. 5, an ACK/NACK signal and CQI signal employ different signal formats and their RSs are defined in different positions (that is, the positions of these RS are optimized independently in case where only an ACK/NACK signal is received and in case where only a CQI signal is received). Therefore, there is a problem that the amount of interference from an ACK/NACK signal to RSs of a CQI signal varies depending on the content of data of the ACK/NACK signal or the phases of $W_1$ and $W_2$ used for the ACK/NACK signal. That is to say, even though RSs are important portions for receiving a CQI signal, there is a possibility that the amount of interference in these RSs cannot be predicted, thereby deteriorating CQI receiving performance.

It is therefore an object of the present invention to provide a radio transmitting apparatus and radio transmitting method for improving CQI receiving performance when a delay, for example, occurs on a channel, when transmission timing lags occur or when residual interference occurs between different cyclic shift amounts of ZC sequences.

Means for Solving the Problem

The radio transmitting apparatus according to the present invention employs a configuration which includes: an acknowledgement/negative acknowledgement signal transmission processing section that spreads an acknowledgement/negative acknowledgement signal using an orthogonal sequence; a reference signal phase adding section that adds a phase according to part of the orthogonal sequence, to a reference signal of a channel quality indicator multiplexed with the acknowledgement/negative acknowledgement spread using the orthogonal sequence; and a transmitting section that transmits a channel quality indicator signal including the reference signal to which the phase is added.

The radio transmitting method according to the present invention includes: an acknowledgement/negative acknowledgement signal transmission processing step of spreading an acknowledgement/negative acknowledgement signal using an orthogonal sequence; a reference signal phase adding step of adding a phase according to part of the orthogonal sequence, to a reference signal of a channel quality indicator multiplexed with the acknowledgement/negative acknowledgement signal spread using the orthogonal sequence; and a transmitting step of transmitting a channel quality indicator signal including the reference signal to which the phase is added.

Advantageous Effects of Invention

According to the present invention, it is possible to improve CQI receiving performance when a delay, for example, occurs on a channel, when transmission timing lags occur or when residual interference occurs between different cyclic shift amounts of ZC sequences.

BEST MODE FOR CARRYING OUT THE INVENTION

Hereinafter, embodiments of the present invention will be explained in detail with reference to the accompanying drawings.

Embodiment 1

Figure 6:
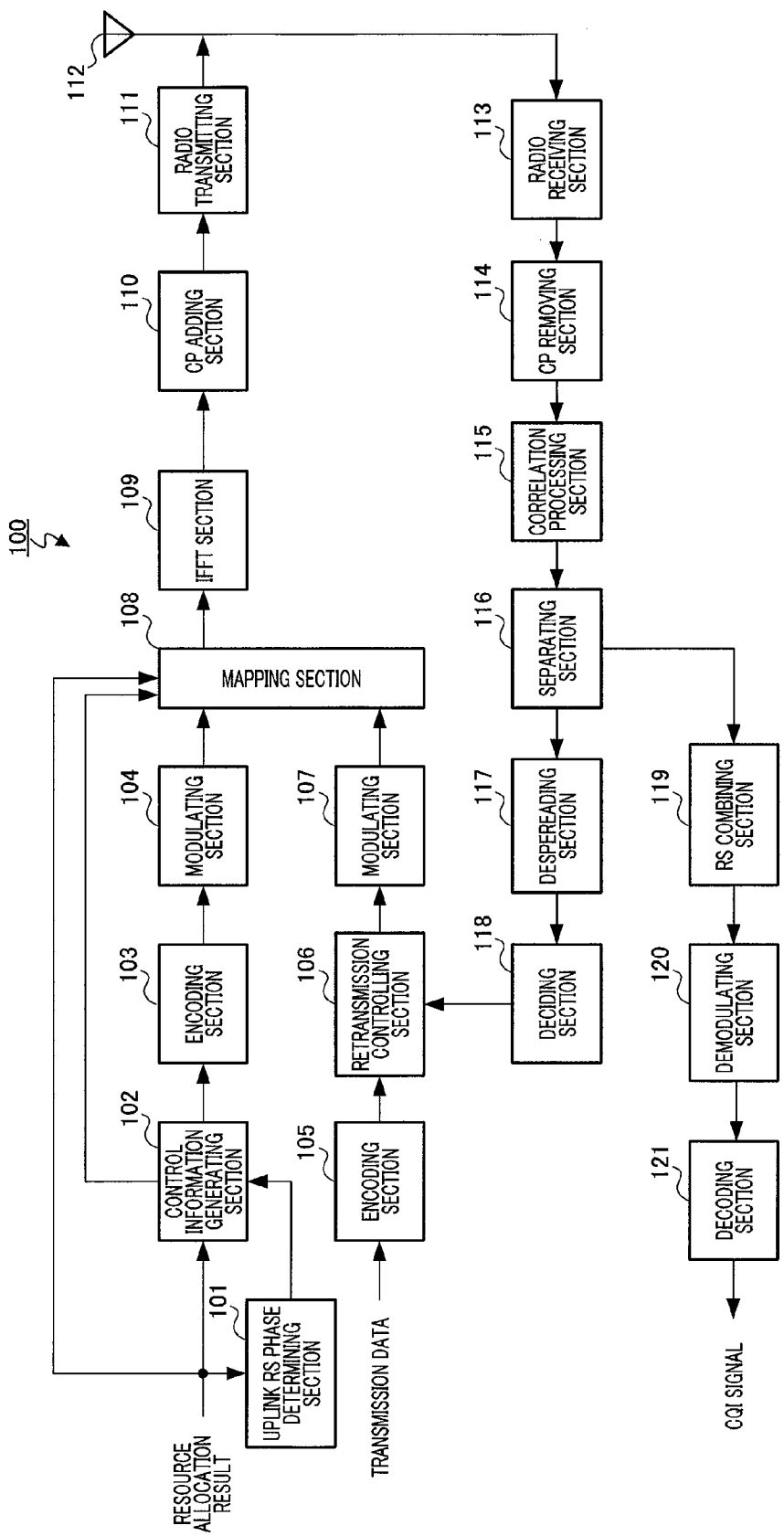
FIG. 6 is a block diagram showing a configuration of a base station according to Embodiment 1 of the present invention.
Figure 7:
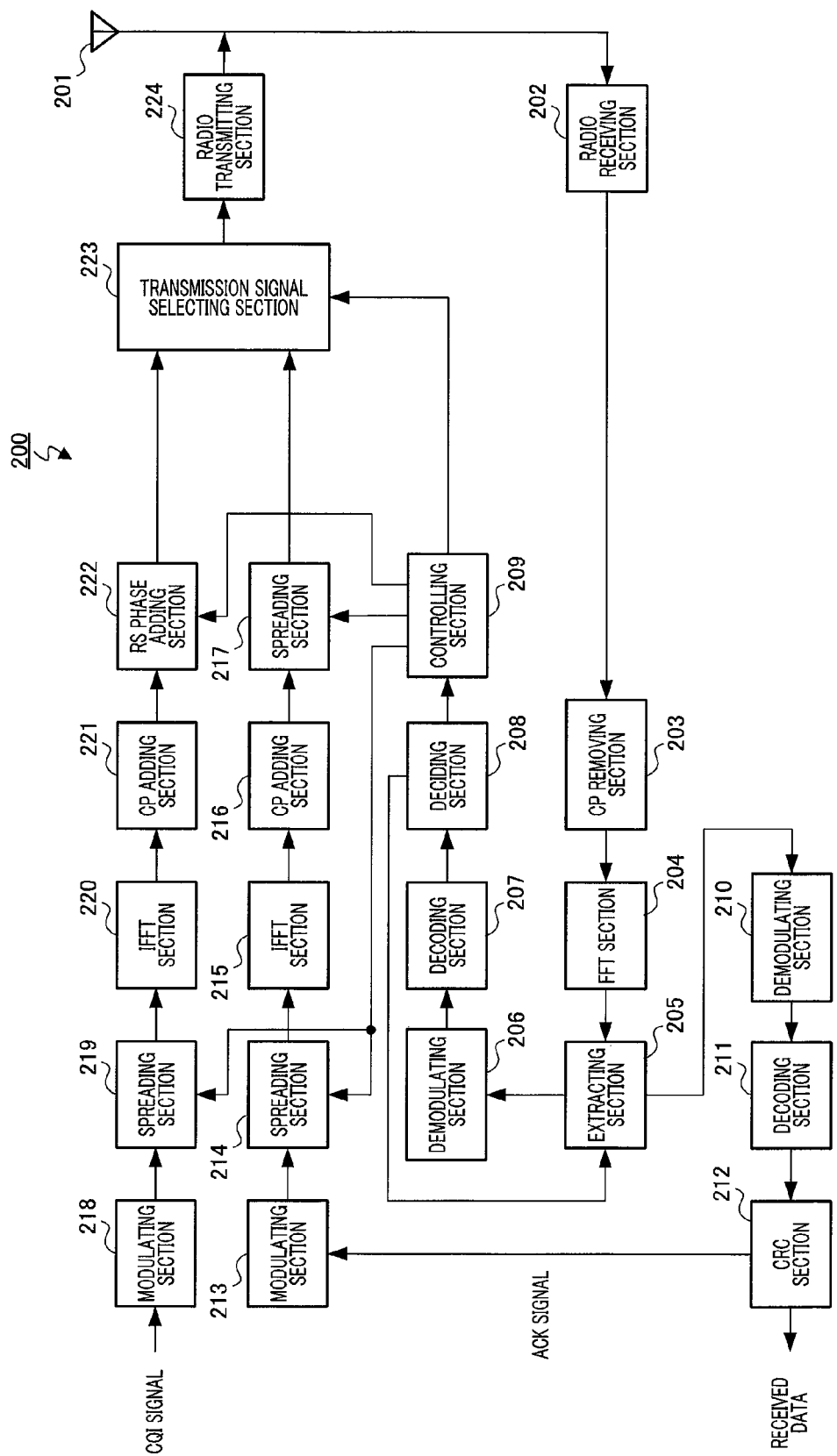
FIG. 7 is a block diagram showing a configuration of a mobile station according to Embodiment 1 of the present invention.

FIG. 6 shows a configuration of base station 100 according to Embodiment 1 of the present invention, and FIG. 7 shows a configuration of mobile station 200 according to Embodiment 1 of the present invention.

Further, to avoid complicated explanation, FIG. 6 shows components that are related to transmission of downlink data and reception of an ACK/NACK signal in response to this downlink data in uplink that are closely related to the present invention, and the components related to reception of uplink data will not be shown or explained. Similarly, FIG. 7 shows components that are related to reception of downlink data and transmission of an ACK/NACK signal in response to this downlink data in uplink that are closely related to the present invention, and components related to transmission of uplink data will not be shown or explained.

Further, a case will be explained below where a ZC sequence is used for first spreading and a Walsh sequence is used for second spreading. However, instead of ZC sequences, sequences that can be separated based on different cyclic shift amounts may be used for first spreading. Similarly, orthogonal sequences other than Walsh sequences may be used for second spreading.

Further, a case will be explained below where a ZC sequence of a sequence length of 12 and a Walsh sequence ($W_0$, $W_1$, $W_2$ and $W_3$) of a sequence length of 4 are used. However, the present invention is not limited to these sequence lengths.

Further, in the following description, twelve ZC sequences of cyclic shift amounts of 0 to 11 are represented as ZC #0 to ZC #11, and four Walsh sequences of sequence numbers 0 to 3 are represented as W #0 to W #3.

Furthermore, in the following description, assume that L1/L2CCH #1 occupies CCE#1, L1/L2CCH #2 occupies CCE#2, L1/L2CCH #3 occupies CCE#3, L1/L2CCH #4 occupies CCE#4 and CCE#5, L1/L2CCH #5 occupies CCE#6 and CCE#7, and L1/L2CCH #6 occupies CCE#8 to CCE#11.

Still further, in the following explanation, assume that a CCE number and a PUCCH number defined by the cyclic shift amount of a ZC sequence and a Walsh sequence number are associated one by one. That is, CCE#1 corresponds to PUCCH #1, CCE#2 corresponds to PUCCH #2, CCE#3 corresponds to PUCCH #3 and . . . .

In base station 100 shown in FIG. 6, a downlink data resource allocation result is inputted to uplink RS phase determining section 101, control information generating section 102 and mapping section 108.

Uplink RS phase determining section 101 determines which one of "+" and "−" is used for the RS phases (i.e. the phase of the second symbol and the phase of the sixth symbol) of CQI transmitted from a mobile station, and outputs the determined RS phases to control information generating section 102. For example, in cases where the number of PUCCHs required is small and only two Walsh codes W #0=[1,1,1,1] and W #1=[1,−1,−1,1] are used, Walsh codes in the positions where RSs of CQI are transmitted are (+, +) and (−, −), and therefore uplink RS phase determining section 101 determines to use (+, −), which is orthogonal to both (+, +) and (−, −) for an RS phase.

Control information generating section 102 generates control information for reporting a resource allocation result and the RS phases received as input from RS phase determining section 101, for each mobile station, and outputs the control information to encoding section 103. The control information for each mobile station includes mobile station ID information showing to which mobile station the control information is addressed. For example, the control information includes CRC that is masked by an ID number of a mobile station to which control information is reported as mobile ID information. The control information for each mobile station is encoded in encoding section 103, modulated in modulating section 104 and received as input in mapping section 108. Further, according to the number of CCEs required to report control information, control information generating section 102 allocates one of a plurality of L1/L2CCHs to each mobile station and outputs a CCE number associated with the allocated L1/L2CCH, to mapping section 108. For example, in case where the number of CCEs required to report control information to mobile station #1 is one and therefore L1/L2CCH #1 is allocated to mobile station #1, control information generating section 102 outputs CCE number #1 to mapping section 108. Further, in case where the number of CCEs required to report control information to mobile station #1 is four and therefore L1/L2CCH #6 is allocated to mobile station #1, control information generating section 102 outputs CCE numbers #8 to #11 to mapping section 108.

Encoding section 105 encodes transmission data (i.e. downlink data) for each mobile station, and outputs the transmission data to retransmission controlling section 106.

Upon first transmission, retransmission controlling section 106 holds encoded transmission data per mobile station, and outputs transmission data to modulating section 107. Retransmission controlling section 106 holds transmission data until an ACK from each mobile station is received as input from deciding section 118. Further, when a NACK from each mobile station is received as input from deciding section 118, that is, when retransmission is performed, retransmission controlling section 106 outputs the transmission data matching this NACK, to modulating section 107.

Modulating section 107 modulates the encoded transmission data received as input from retransmission controlling section 106, and outputs the transmission data to mapping section 108.

When control information is transmitted, mapping section 108 maps control information received as input from modulating section 104, on physical resources according to the CCE number received as input from control information generating section 102, and outputs the control information to IFFT section 109. That is, mapping section 108 maps control information for each mobile station, on a subcarrier associated with a CCE number in a plurality of subcarriers forming an OFDM symbol.

By contrast with this, when downlink data is transmitted, mapping section 108 maps the transmission data for each mobile station, on the physical resources according to the resource allocation result, and outputs the transmission data to IFFT section 109. That is, mapping section 108 maps transmission data for each mobile station, on one of a plurality of subcarriers forming an OFDM symbol according to the resource allocation result.

IFFT section 109 generates an OFDM symbol by performing an IFFT of a plurality of subcarriers on which control information or transmission data is mapped, and outputs the OFDM symbol to CP (Cyclic Prefix) adding section 110.

CP adding section 110 adds the same signal as the rear portion of the OFDM symbol as a CP to the head of that OFDM symbol.

Radio transmitting section 111 performs transmission processing such as D/A conversion, amplification and up-conversion with respect to the OFDM symbol to which a CP is added, and transmits the OFDM symbol from antenna 112 to mobile station 200 (FIG. 7).

Meanwhile, radio receiving section 113 receives the signal transmitted from mobile station 200 through antenna 112, and performs receiving processing such as down-conversion and A/D conversion with respect to the received signal. Note that, in a received signal, an ACK/NACK signal transmitted from a given mobile station and CQI signals transmitted from other mobile stations are code-multiplexed.

CP removing section 114 removes the CP added to the signal after receiving processing.

Correlation processing section 115 finds a correlation value between the signal received as input from CP removing section 114 and the ZC sequence used for first spreading in mobile station 200. That is, a correlation value determined using the ZC sequence associated with the cyclic shift amount allocated to an ACK/NACK signal and a correlation value determined using ZC sequence associated with the cyclic shift amount allocated to a CQI signal are outputted to separating section 116.

Separating section 116 outputs the ACK/NACK signal to despreading section 117 and the CQI signal to RS combining section 119 based on the correlation values received as input from correlation processing section 115.

Despreading section 117 despreads the ACK/NACK signal received as input from despreading section 116 using a Walsh sequence used for second spreading in mobile station 200, and outputs the despread signal to deciding section 118.

Deciding section 118 detects the ACK/NACK signal of each mobile station by detecting a correlation peak of each mobile station using the detection window set for each mobile station in the time domain. For example, in case where a correlation peak is detected in detection window #1 for mobile station #1, deciding section 118 detects the ACK/NACK signal from mobile station #1. Then, deciding section 118 decides whether the detected ACK/NACK signal is an ACK or NACK, and outputs an ACK or NACK from each mobile station, to retransmission controlling section 106.

RS combining section 119 coordinates and combines the phases of a plurality of RSs of CQI received as input from separating section 116, and estimates a channel using the combined RS. The estimated channel information and the CQI signals received as input from separating section 116 are outputted to demodulating section 120.

Demodulating section 120 demodulates the CQI signal received as input from RS combining section 119 using channel information, and decoding section 121 decodes the demodulated CQI signal and outputs the CQI signal.

By contrast with this, in mobile station 200 shown in FIG. 7, radio receiving section 202 receives through antenna 201 an OFDM symbol transmitted from base station 100, and performs receiving processing such as down-conversion and A/D conversion with respect to the OFDM symbol.

CP removing section 203 removes the CP added to the OFDM symbol after receiving processing.

FFT (Fast Fourier Transform) section 204 performs an FFT with respect to the OFDM symbol to acquire the control information or downlink data mapped on a plurality of subcarriers, and outputs the result to extracting section 205.

To receive control information, extracting section 205 extracts the control information from a plurality of subcarriers, and outputs the control information to demodulating section 206. This control information is demodulated in demodulating section 206, decoded in decoding section 207 and received as input in deciding section 208.

By contrast with this, to receive downlink data, extracting section 205 extracts the downlink data addressed to mobile station 200 from a plurality of subcarriers according to the resource allocation result received as input from deciding section 208, and outputs the downlink data to demodulating section 210. This downlink data is demodulated in demodulating section 210, decoded in decoding section 211 and received as input in CRC section 212.

CRC section 212 performs error detection with respect to the decoded downlink data using a CRC check, and generates an ACK if CRC=OK (i.e. no error) or generates a NACK if CRC=NG (i.e. error present) and outputs the generated ACK/NACK signal to modulating section 213. Further, if CRC=OK (i.e. no error), CRC section 212 outputs the decoded downlink data as received data.

Deciding section 208 performs blind decision as to whether or not the control information received as input from decoding section 207 is addressed to mobile station 200. For example, by performing demasking using the ID number of mobile station 200, deciding section 208 decides that the control information showing that CRC=OK (i.e. no error) is addressed to mobile station 200. Then, deciding section 208 outputs the control information addressed to mobile station 200, that is, the downlink data resource allocation result for mobile station 200, to extracting section 205. Further, deciding section 208 decides a PUCCH number used to transmit an ACK/NACK signal from mobile station 200, based on the CCE number associated with a subcarrier on which the control information addressed to mobile station 200 is mapped, and outputs the decision result (i.e. PUCCH number) to controlling section 209. For example, control information is mapped on the subcarrier associated with CCE#1, and therefore deciding section 208 of mobile station 200, to which above L1/L2CCH #1 is allocated, decides that PUCCH #1 associated with CCE#1 is the PUCCH for mobile station 200. Further, control information is mapped on subcarriers associated with CCE#8 to CCE#11, and therefore deciding section 208 of mobile station 200, to which above L1/L2CCH #6 is allocated, decides that PUCCH #8 associated with CCE#8 of the smallest number among CCE#8 to CCE#11, is the PUCCH for mobile station 200. Furthermore, deciding section 208 extracts the RS phases included in the control information received as input from decoding section 207, and outputs the RS phases to controlling section 209.

According to the PUCCH number received as input from deciding section 208, controlling section 209 controls a cyclic shift amount of a ZC sequence used for first spreading in spreading section 214 and spreading section 219, and a Walsh sequence used for second spreading in spreading section 217. That is, controlling section 209 sets the ZC sequence of a cyclic shift amount associated with the PUCCH number received as input from deciding section 208 in spreading section 214 and spreading section 219, and sets a Walsh sequence associated with the PUCCH number received as input from deciding section 208, in spreading section 217. Further, controlling section 209 controls RS phase adding section 222 according to the RS phases received as input from deciding section 208. Further, controlling section 209 controls transmission signal selecting section 223 to select transmission of a CQI signal if base station 100 commands transmission of CQI in advance, and to transmit the ACK/NACK signal generated based on CRC=NG (i.e. error present) in deciding section 208 if base station 100 does not command transmission of CQI in advance.

Modulating section 213 modulates the ACK/NACK signal received as input from CRC section 212, and outputs the ACK/NACK signal to spreading section 214. Spreading section 214 performs first spreading of the ACK/NACK signal using the ZC sequence set in controlling section 209, and outputs the ACK/NACK signal after first spreading, to IFFT section 215. IFFT section 215 performs an IFFT with respect to the ACK/NACK signal after first spreading, and outputs the ACK/NACK signal after the IFFT, to CP adding section 216. CP adding section 216 adds the same signal as the rear portion of the ACK/NACK signal after the IFFT, to the head of the ACK/NACK signal as a CP. Spreading section 217 performs second spreading of the ACK/NACK signal to which the CP is added, using a Walsh sequence set in controlling section 209, and outputs the ACK/NACK signal after second spreading, to transmission signal selecting section 223. Further, modulating section 213, spreading section 214, IFFT section 215, CP adding section 216 and spreading section 217 function as an ACK/NACK signal transmission processing means.

Modulating section 218 modulates a CQI signal and outputs the CQI signal to spreading section 219. Spreading section 219 spreads the CQI signal using the ZC sequence set in controlling section 209, and outputs the spread CQI signal to IFFT section 220. IFFT section 220 performs an IFFT with respect to the spread CQI signal, and outputs the CQI signal after the IFFT, to CP adding section 221. CP adding section 221 adds the same signal as the rear portion of the CQI signal after the IFFT, to the head of that CQI signal as a CP.

RS phase adding section 222 adds the phases set in controlling section 209, to the CQI signal received as input from CP adding section 221, and outputs the CQI signal to which the phases are added, to transmission signal selecting section 223.

According to the setting in controlling section 209, transmission signal selecting section 223 selects one of the ACK/NACK signal received as input from spreading section 217 and the CQI signal received as input from RS phase adding section 222, and outputs the selected signal to radio transmitting section 224 as a transmission signal.

Radio transmitting section 224 performs transmission processing such as D/A conversion, amplification and up-conversion with respect to the transmission signal received as input from transmission signal selecting section 223, and transmits the transmission signal from antenna 201 to base station 100 (FIG. 6).

Next, how a CQI signal is generated in mobile station 200 shown in FIG. 7 will be explained. Note that, instead of transmitting an ACK/NACK signal and CQI signal at the same time, mobile station 200 transmits one of these. Further, the ACK/NACK signal is generated as shown in FIG. 7.

Figure 1:
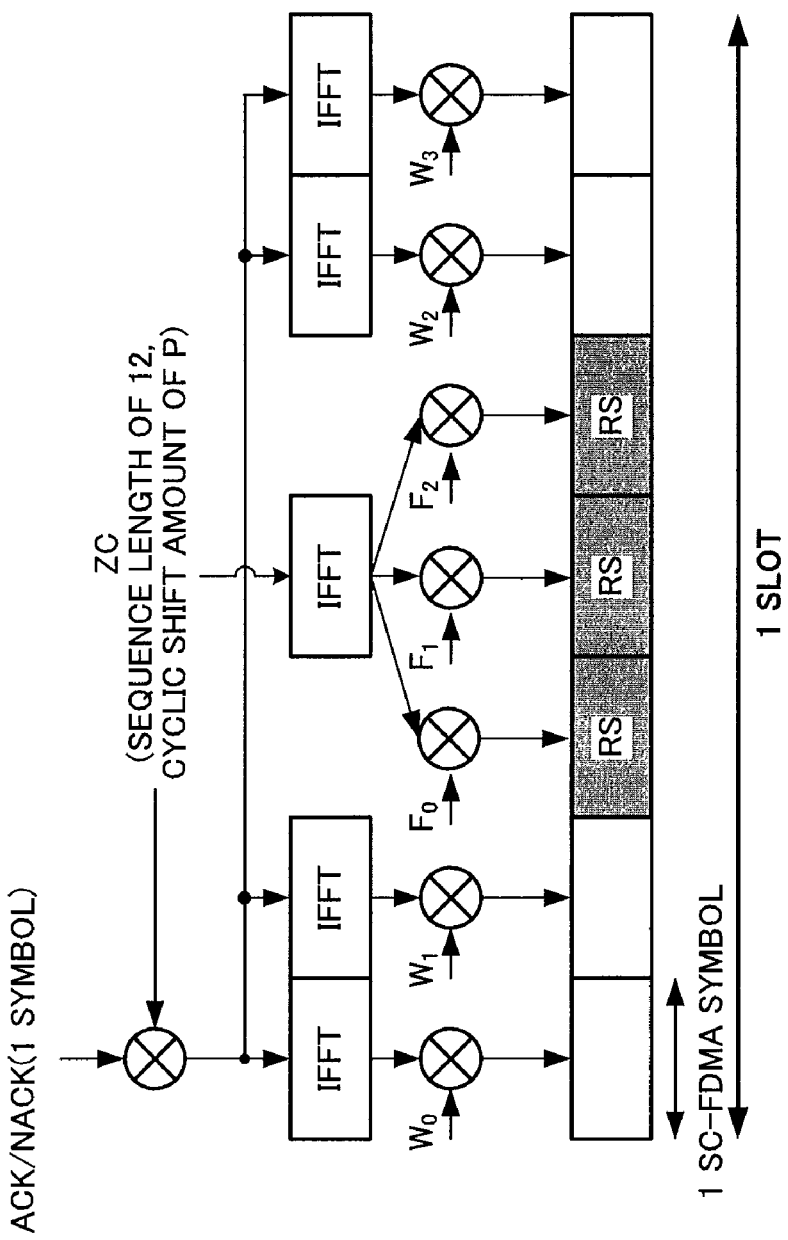
FIG. 1 shows a method of spreading an ACK/NACK signal.
Figure 2:
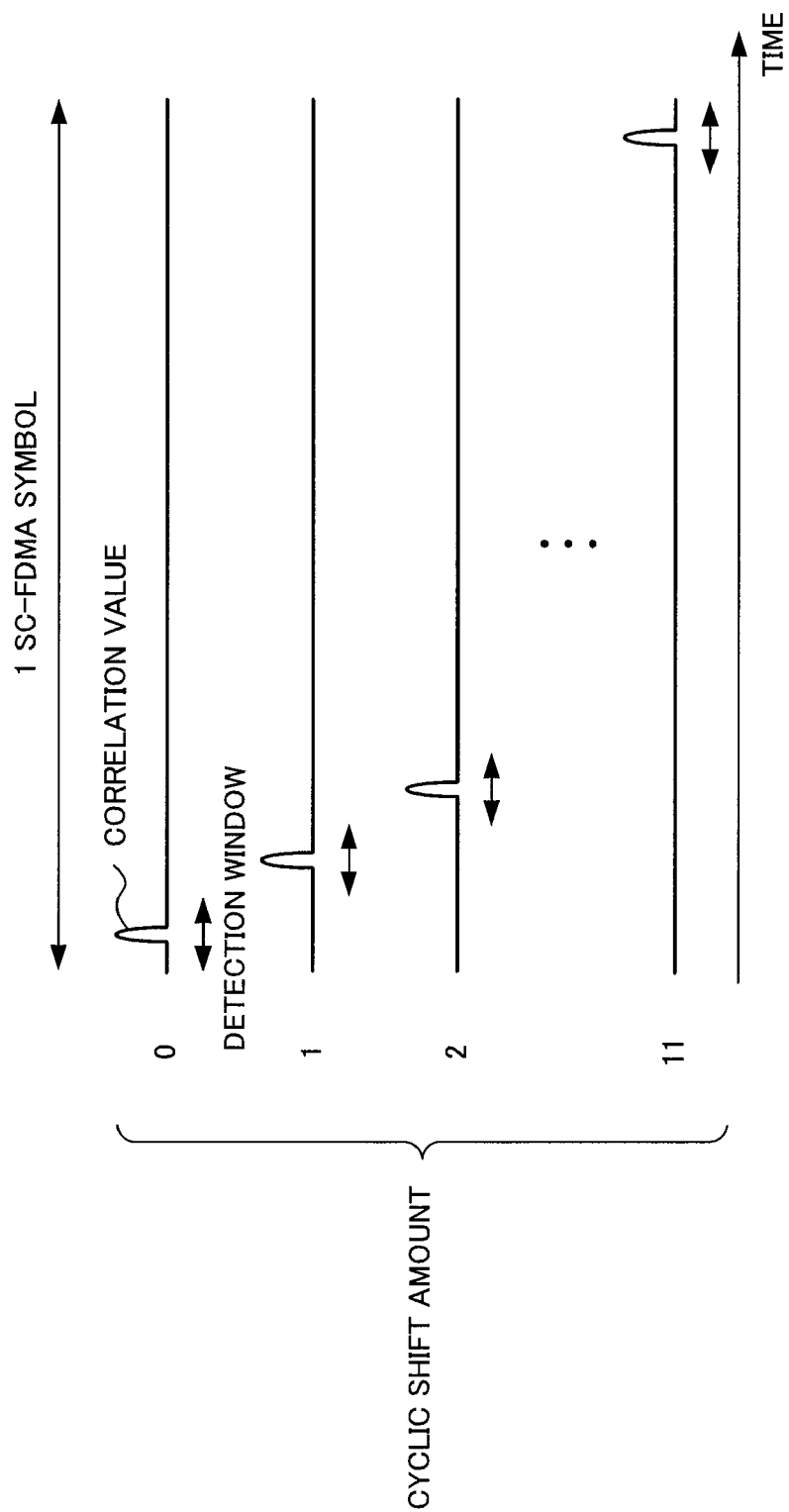
FIG. 2 shows correlation processing of an ACK/NACK signal spread using a ZC sequence (in case of the ideal communication environment)
Figure 3:
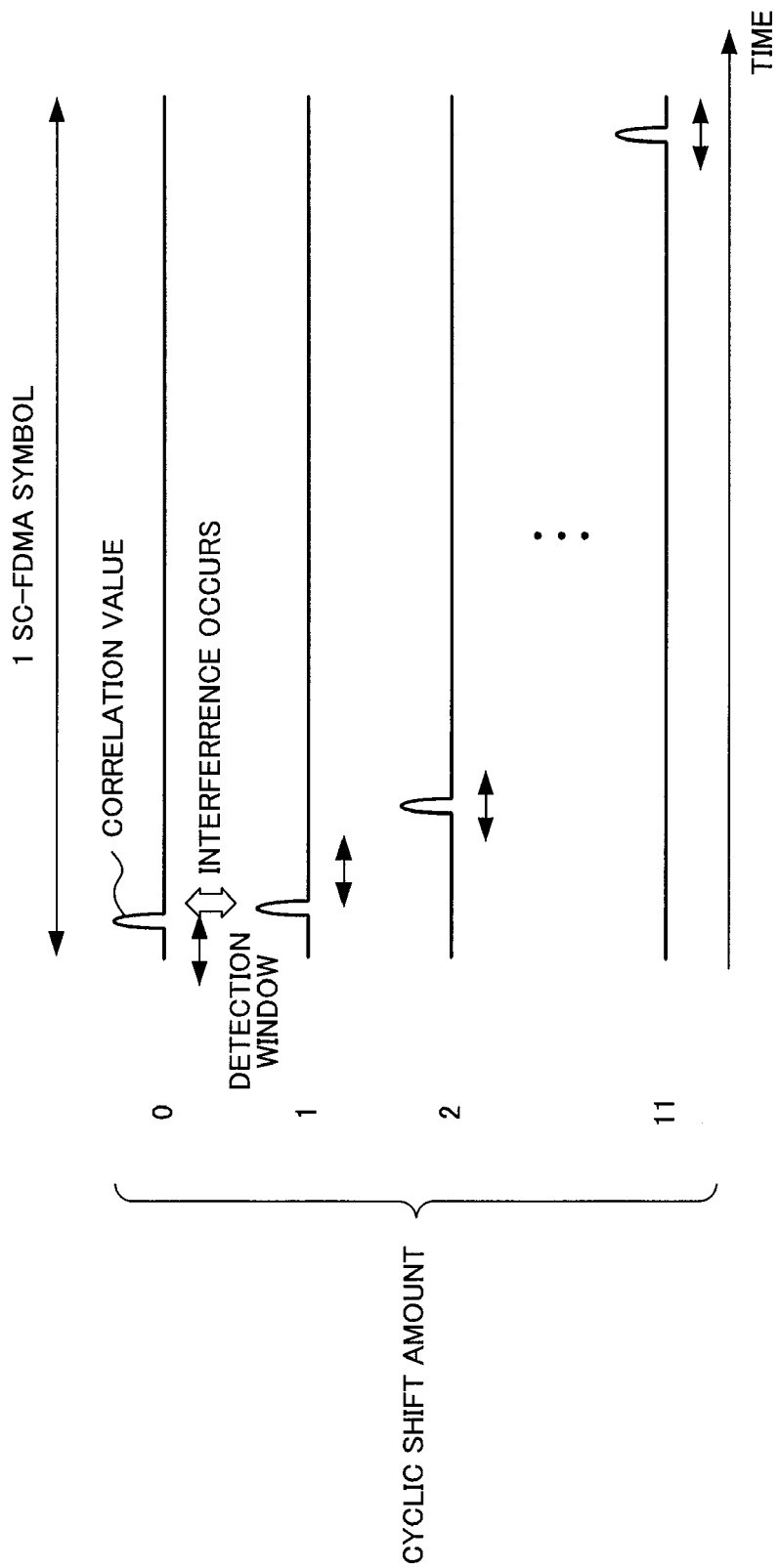
FIG. 3 shows correlation processing of an ACK/NACK signal spread using a ZC sequence (in case where there are transmission timing lags)
Figure 4:
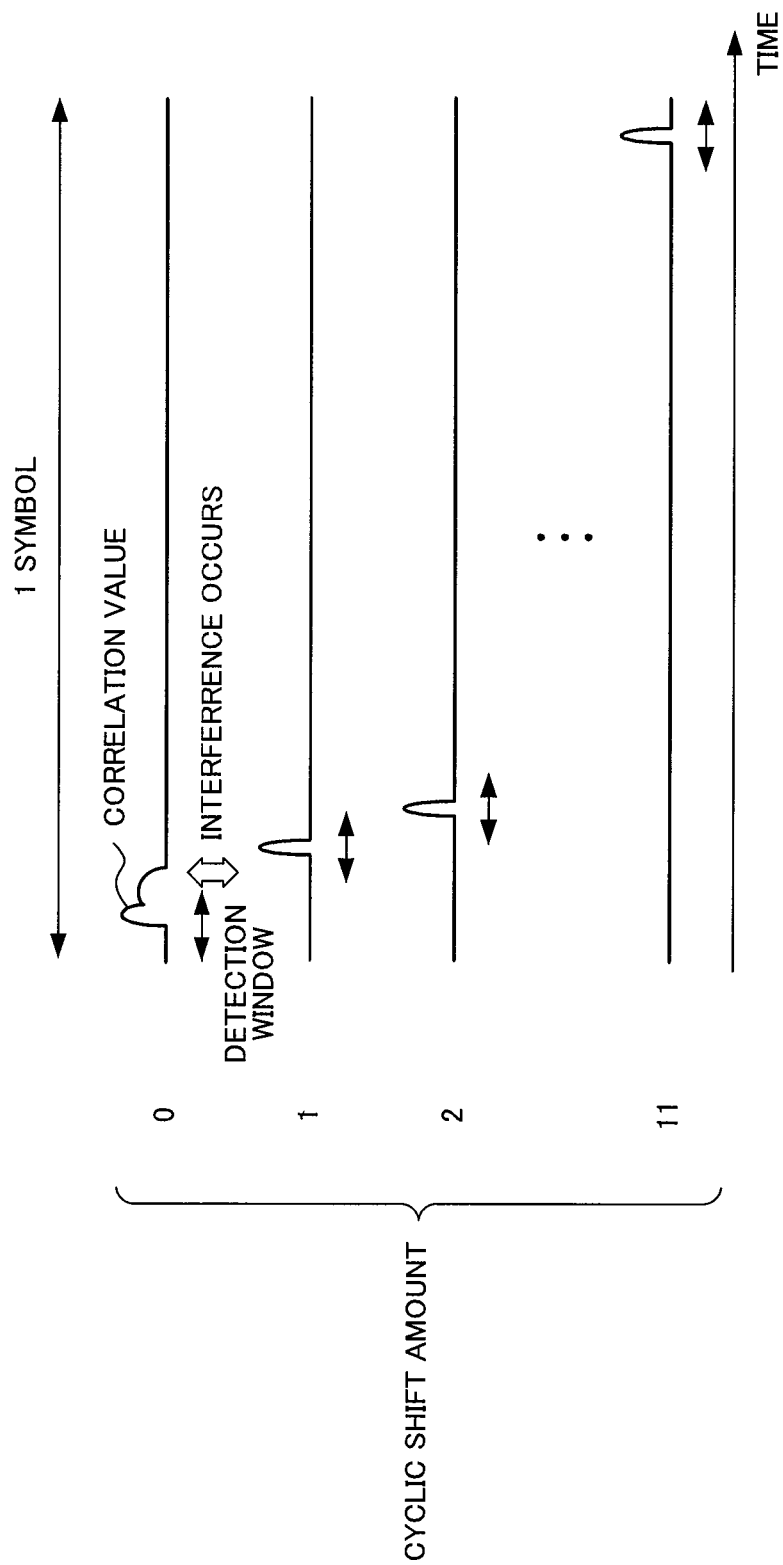
FIG. 4 shows correlation processing of an ACK/NACK signal spread using a ZC sequence (in case where there are delay waves)
Figure 5:
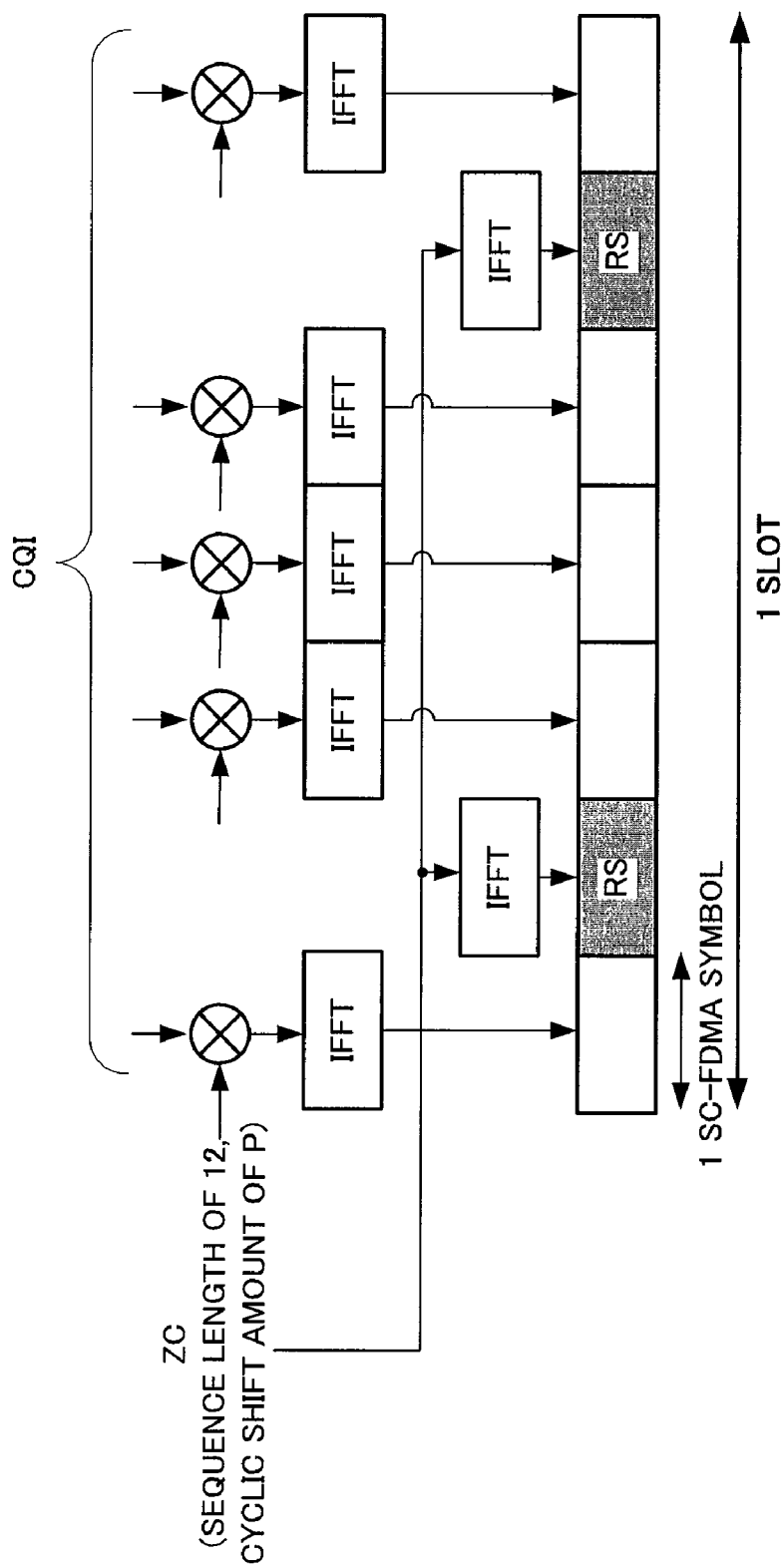
FIG. 5 shows a method of spreading a CQI signal.

As shown in FIG. 5, five symbols of information are spread by spreading section 219 using the ZC sequence, the CP is added by CP adding section 221 and then CQI is mapped over the five SC-FDMA symbols. Further, the ZC sequence is mapped on two SC-FDMA symbols of the second symbol and the sixth symbol as RSs.

Here, assume that base station 100 uses only two Walsh sequences determined in advance for ACK/NACK transmission. That is, although the system can utilize four Walsh sequences, base station 100 designates use of only two Walsh sequences W #0=[1,1,1,1] and W #1=[1,−1,−1,1]. Mobile station 200 transmitting ACK/NACK signals use only these Walsh sequences. Similarly, base station 100 designates use of (+, −) as the RS phases (the phase of the second symbol and the phase of the sixth symbol) of CQI. That is, as described above, RS phase adding section 222 of mobile station 200 in FIG. 7 transmitting CQI signals adds RS phases of CQI. At this time, how an ACK/NACK signal is transmitted and a CQI signal is generated is as shown in FIG. 8.

Figure 8:
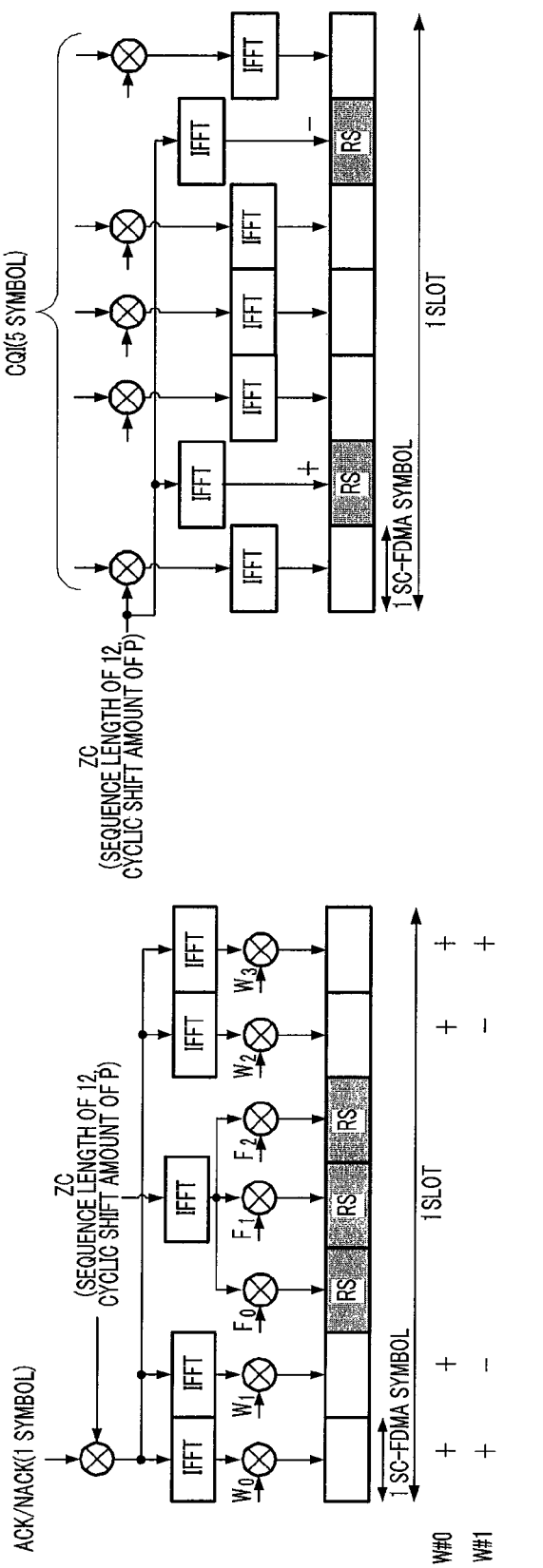
FIG. 8 shows how an ACK-NACK signal is transmitted and a CQI signal is generated.

As shown in FIG. 8, Walsh sequence W #1 is applied to the data (corresponding to the outlined portion in the figure) of an ACK/NACK signal. By contrast with this, "+" is added to an RS of CQI as the RS phase of the second symbol, and "−" is added to an RS of CQI as the RS phase of the sixth symbol. That is, subsequences ($W_1$ and $W_2$) of the Walsh sequence multiplexed with RSs of CQI and applied to the second symbol and sixth symbol of the ACK/NACK signal show (+, +) or (−, −), and, RS combining section 119 of base station 100 coordinates and combines the phases of RSs of CQI (by inverting the reception result in the sixth symbol), thereby inverting in the second symbol and sixth symbol the phases of the signal spread using Walsh sequences, so that the phases cancel each other and interference from an ACK/NACK signal to RSs of CQI can be reduced.

Further, the Walsh sequence and the selection result of RS phases of CQI in given base station 100 are broadcast from base station 100 at regular intervals.

In this way, according to Embodiment 1, by making RSs of CQI transmitted from a mobile station orthogonal to second spreading codes of an ACK/NACK signal multiplexed in the same positions as these RSs and coordinating and averaging RS phases of CQI in the base station, the influence of noise can be reduced and interference received from ACK/NACK signals transmitted from other mobile stations can be reduced, so that it is possible to improve the accuracy of channel estimation in CQI and improve the accuracy of receiving CQI signals. Further, an ACK/NACK signal is despread when the ACK/NACK signals are received and therefore reverse phases of RS portions of CQI are added, so that it is possible to reduce interference signals from RS portions of CQI to an ACK/NACK signal. That is, it is possible to improve the accuracy of receiving ACK/NACK signals.

Further, although a case has been explained with the present embodiment where two of four Walsh sequences that can be utilized in the system are used, it is equally possible to determine the priority for four Walsh sequences in advance and use Walsh sequences in order from the highest priority. A case will be explained below where priority is assigned to four Walsh sequences.

Figure 9:
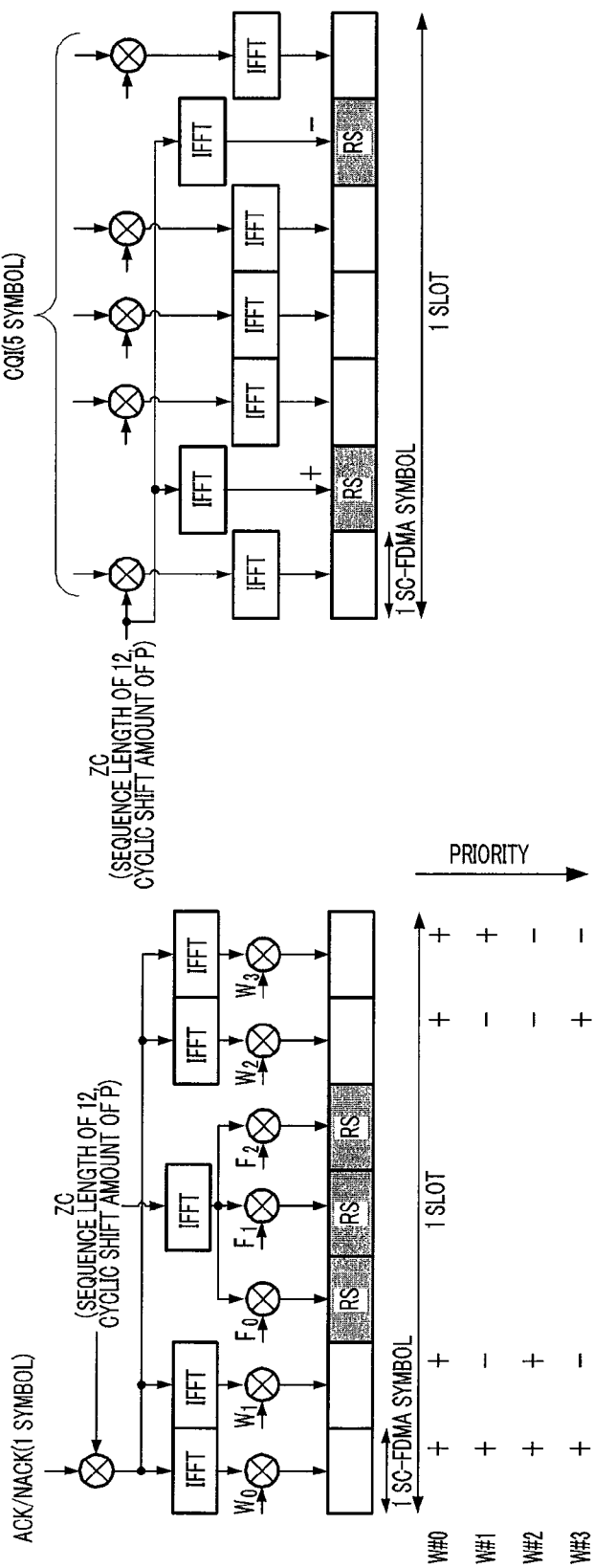
FIG. 9 shows how a Walsh sequence that is frequently used and RS phases of CQI are made orthogonal.

The base station broadcasts to all mobile stations that each mobile station must transmit CQI using the phases orthogonal to subsequences ($W_1$ and $W_2$) of the Walsh sequence that is frequently used. The amount of interference to RSs of CQI increases depending on the number of mobile stations using Walsh sequences that are not orthogonal to RSs of CQI, and, by making the RS phases of CQI and Walsh sequences that are frequently used orthogonal to each other, it is possible to reduce the total amount of interference to RSs of CQI. This situation is shown in FIG. 9.

Figure 10:
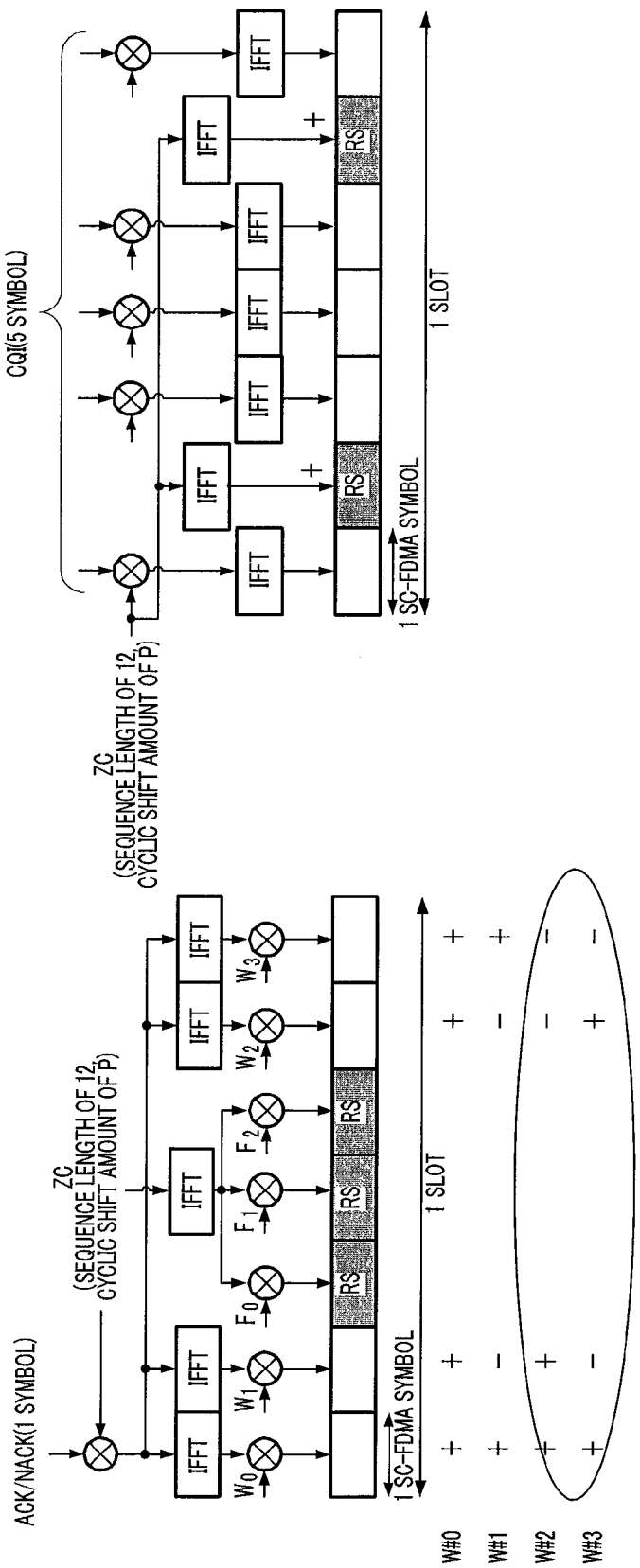
FIG. 10 shows how RS phases of CQI are adaptively controlled according to a Walsh sequence that is frequently used.
Figure 11:
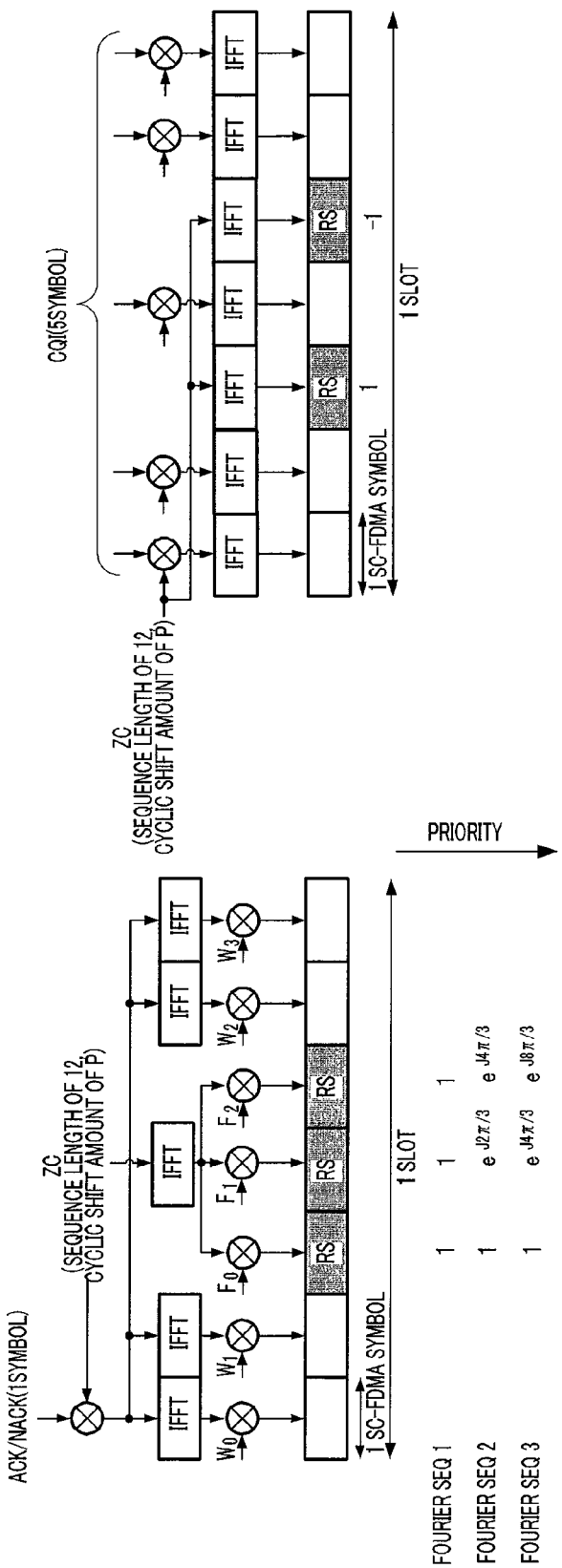
FIG. 11 shows how an ACK/NACK signal is transmitted and a CQI signal is generated in case where the positions of RSs of CQI are multiplexed with RSs of an ACK/NACK.

Further, even if the base station does not broadcast information related to RS phases of uplink CQI in advance, mobile stations may designate RS phases of CQI every time according to the timings to transmit CQI. Although which mobile station transmits an uplink signal in a given subframe or which uplink code resources are used to perform transmission in mobile stations changes on a per subframe basis, the base station has learned in advance which Walsh sequence is more frequently used in a frame for transmitting CQI, and, consequently, can adaptively command mobile stations to transmit RSs of CQI by making the RSs of CQI and the Walsh sequence ($W_1$ and $W_2$) that is more frequently used orthogonal to each other. By this means, it is possible to reduce the total amount of interference to RSs of CQI. This situation is shown in FIG. 10. Further, a case where the positions of RSs of CQI are multiplexed with RSs of an ACK/NACK is shown in FIG. 11.

Further, in case where a second spreading sequence other than a Walsh sequence is used for an ACK/NACK, whether the codes of S1 and S2 are the in-phases or the reverse phases is checked by focusing on the codes in portions (S1 and S2) associated with RSs of CQI in the second spread sequence (S0, S1, S2 and S3) used in this base station.

That is, whether the second and third codes in the second spread sequence used in the base station are in-phase sequences or reverse phase sequences checked, and, if a greater number of sequences in which the second and third symbols are in-phases are used, (+, −) may be used as the RS phases and, if a greater number of sequences in which the second and third symbols are reverse phases are used, (+, +) may be used as the RS phases.

Note that (−, +) and (−, −) may be used as RS phases instead of (+, −) and (+, +).

Embodiment 2

The configurations of a base station and mobile station according to Embodiment 2 of the present invention are the same as the configurations shown in FIG. 6 and FIG. 7 of Embodiment 1, and therefore will be explained employing FIG. 6 and FIG. 7.

Figure 12:
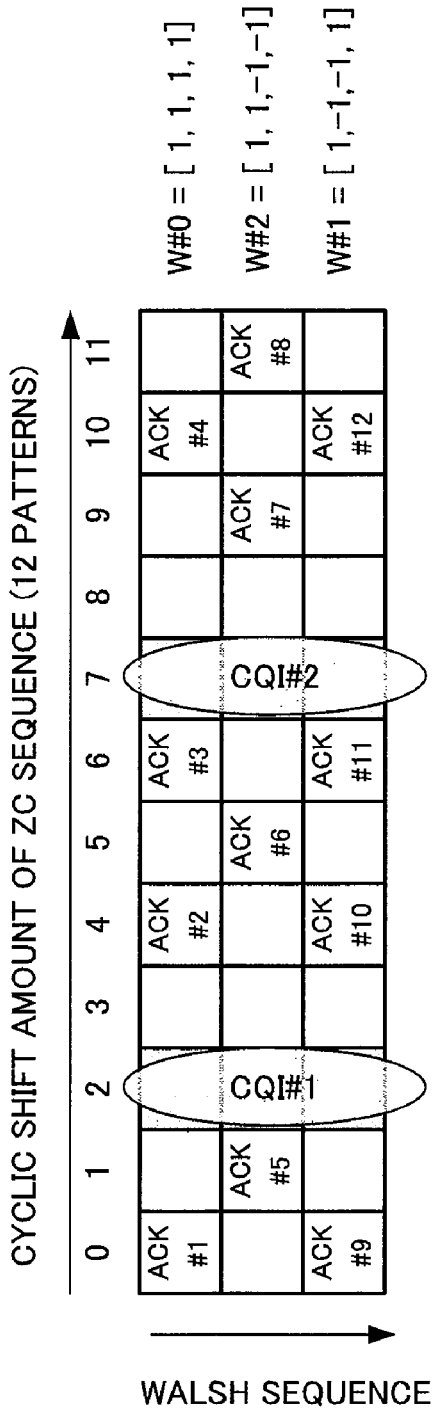
FIG. 12 shows how an ACK/NACK signal and a CQI signal are multiplexed according to Embodiment 2 of the present invention.

How an ACK/NACK signal and CQI signal are multiplexed (i.e. resource allocation) according to Embodiment 2 of the present invention is shown in FIG. 12. Here, assume that the base station performs resource allocation shown in FIG. 12. Note that the horizontal axis represents the cyclic shift amount and the vertical axis represents the Walsh sequence.

Further, it is focused that RSs of CQI are mainly interfered from ACK/NACK signals spread using ZC sequences associated with adjacent cyclic shift amounts. To be more specific, RSs of CQI receive significant interference from nearby ACK/NACK signals of a small cyclic shift amount, and apply great interference to nearby ACK/NACK signals of a high cyclic shift amount.

As shown in FIG. 12, the mobile station that transmits CQI #1 spreads and transmits a CQI signal using the ZC sequence associated with a cyclic shift amount of 2. At this time, CQI #1 receives the greatest interference from ACK #5 and, therefore, focusing on the phases ($W_1=1$ and $W_2=-1$) of $W_1$ and $W_2$ of ACK #5, uplink RS phase determining section 101 of base station 100 determines (+, +) as the RS phases of CQI.

Further, CQI #2 receives interference from ACK #3 and ACK #11 and, therefore, focusing on the phases ($W_1=1$ and $W_2=1$) of $W_1$ and $W_2$ of ACK #3 and the phases ($W_1=-1$ and $W_2=-1$) of $W_1$ and $W_2$ of ACK #11, uplink RS phase determining section 101 of base station 100 determines (+, −) as the RS phases of CQI.

In this way, according to Embodiment 2, the RS phases of CQI are determined focusing on Walsh codes of an ACK/NACK signal that actually receives significant interference, so that it is possible to effectively reduce the amount of interference in RSs.

Figure 13:
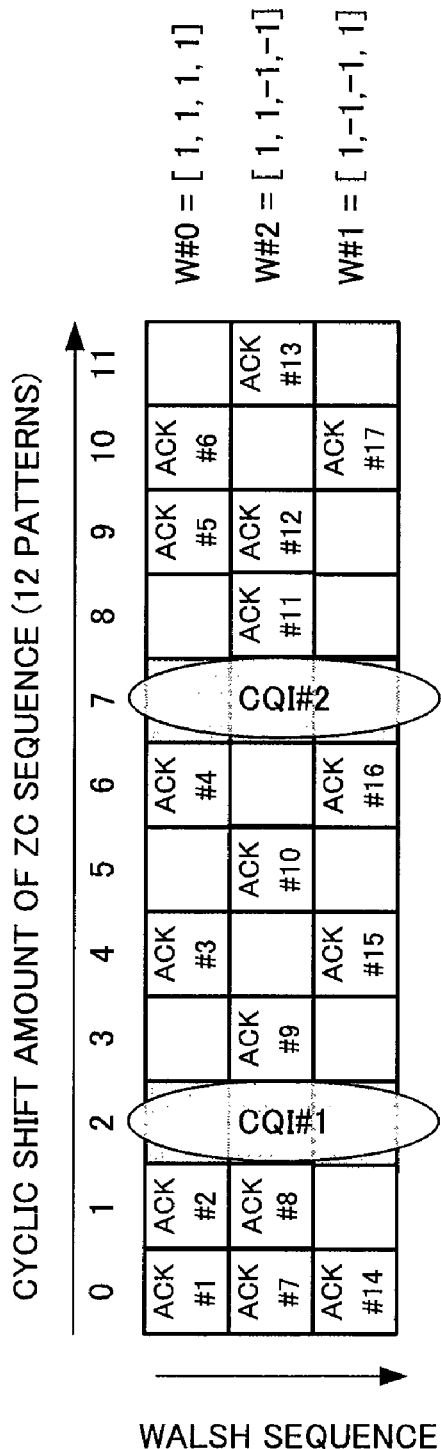
FIG. 13 shows how an ACK/NACK signal and a CQI signal are multiplexed in another way according to Embodiment 2 of the present invention.

Further, although the resource allocation shown in FIG. 12 is assumed with the present embodiment, the base station may allocate ACK/NACK resources freely. For example, in case where an ACK/NACK signal and CQI signal are multiplexed as shown in FIG. 13, three ACK #2, ACK #8 and ACK #9 are adjacent to CQI #1 and more W #2=[1,1,−1,−1] are used. Therefore, uplink RS phase determining section 101 of base station 100 determines (+, +) as the RS phases of CQI #1. Further, three ACK #4, ACK #11 and ACK #16 are adjacent to CQI #2 and the number of mobile stations using W #0=[1,1,1,1] and W #1=[1,−1,−1,1] is greater than the number of mobile stations using W #2. Therefore, uplink RS phase determining section 101 of base station 100 determines (+, −) as the RS phases of CQI #2.

Further, focusing on that the required error rate of CQI is around $10^{-2}$ while the required error rate of an ACK/NACK signal is around $10^{-4}$, the RS phases of CQI may be set such that ACK/NACK quality further increases. That is, as described above, by making the RS phases of CQI and $W_1$ and $W_2$ of an ACK/NACK signal orthogonal to each other, it is possible to reduce interference to CQI as well as interference from CQI to the ACK/NACK signal. Therefore, in the case shown in FIG. 13, the RS phases are set to reduce the influence upon ACK #9, which is interfered from CQI #1, and ACK #11, which are interfered from CQI #2. That is, ACK #9 and ACK #11 both use W #2 and therefore the RS phases set both in CQI #1 and CQI #2 are (+, +), respectively.

Embodiment 3

A case will be explained with Embodiment 3 of the present invention where a CQI signal and a response signal (i.e. ACK/NACK signal) are transmitted at the same time. That is, although the base station specifies with respect to a mobile station the timing to transmit a CQI signal, cases occur depending on the timing to allocate the downlink data signal of the base station where a given mobile station transmits a CQI signal and a response signal (i.e. an ACK or NACK) in response to a downlink data signal at the same time. At this time, the CQI signal and response signal that are transmitted at the same time are collectively represented as "CQI+response signal." Note that the CQI+response signal is represented as "CQI+NACK signal" in case where the response signal is a NACK and is represented as "CQI+ACK signal" in case where the response signal is an ACK.

Figure 14:
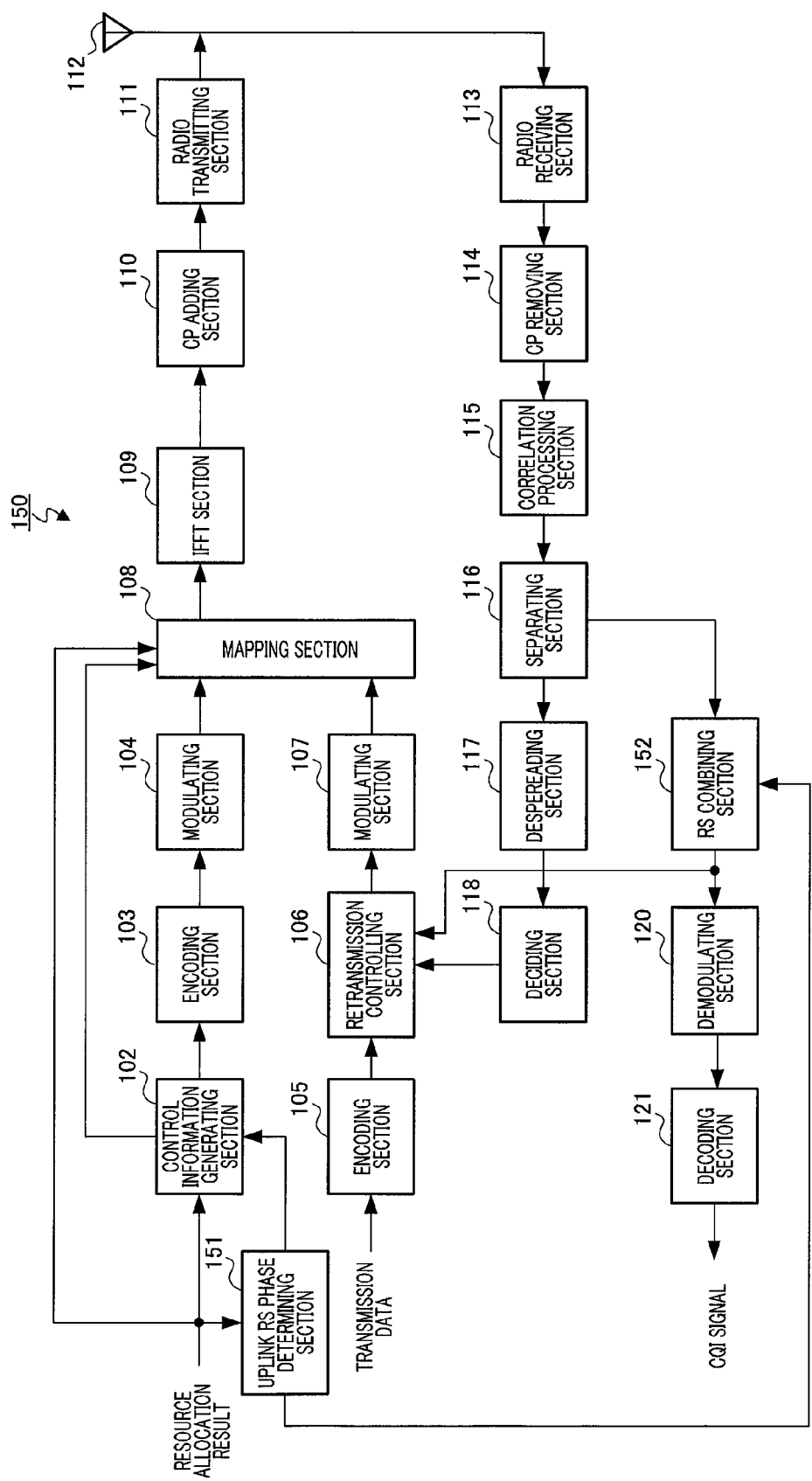
FIG. 14 is a block diagram showing a configuration of a base station according to Embodiment 3 of the present invention.

FIG. 14 shows a configuration of base station 150 according to Embodiment 3 of the present invention. Note that FIG. 14 differs from FIG. 6 in changing uplink RS phase determining section 101 to RS phase determining section 151 and changing RS combining section 119 to RS combining section 152.

Uplink RS phase determining section 151 determines whether the RS phases (i.e. the phase of the second symbol and the phase of the sixth symbol) of a CQI+response signal transmitted from a mobile station defines that (+, −) is CQI+ACK and (+, +) is CQI+NACK, or defines that (+, +) is CQI+ACK and (+, −) is CQI+NACK, and outputs the determined definition of the RS phases to control information generating section 102 and RS combining section 152.

For example, in case where the number of required PUCCHs is small and only two W #0=[1,1,1,1] and W #1= [1,−1, −1,1] are used as Walsh codes, Walsh codes in the positions where RSs of CQI are transmitted are (+, +) and (−, −), and therefore uplink RS phase determining section 151 allocates (+, −) that is orthogonal to both Walsh codes as RS phases and then determines to define that (+, +) is CQI+ACK and define that (+, −) is CQI+NACK.

In case where a mobile station transmits only a CQI signal, RS combining section 152 coordinates and combines the phases of a plurality of RSs of CQI received as input from separating section 116, and estimates a channel using the combined RS. The estimated channel information and the CQI signal received as input from separating section 116 are outputted to demodulating section 120.

Further, in case where a mobile station transmits a CQI+ response signal, RS combining section 152 decides whether power of a plurality of RSs of CQI received as input from separating section 116 is greater either in case where the RS phases are coordinated assuming (+, +) or in case where the RS phases are coordinated assuming (+, −), and decides that the phases of greater power are the RS phases of CQI. Using this decision result of the RS phases and the definition of the RS phases received as input from uplink RS phase determining section 151, whether the response signal transmitted at the same time with CQI is an ACK or NACK is decided. That is, RS combining section 152 provide two correlators having coefficients of (+, +) and coefficients of (+, −) of RS signals, and decides whether the signal transmitted at the same time with CQI is an ACK or NACK using the outputs from these correlators. This decision result is outputted to retransmission controlling section 106. Further, based on this decision result, the RSs obtained by coordinating and combining these phases are used to estimate a channel for decoding the data part of CQI. The estimated channel information and the CQI signal received as input from separating section 116 are outputted to demodulating section 120.

Figure 15:
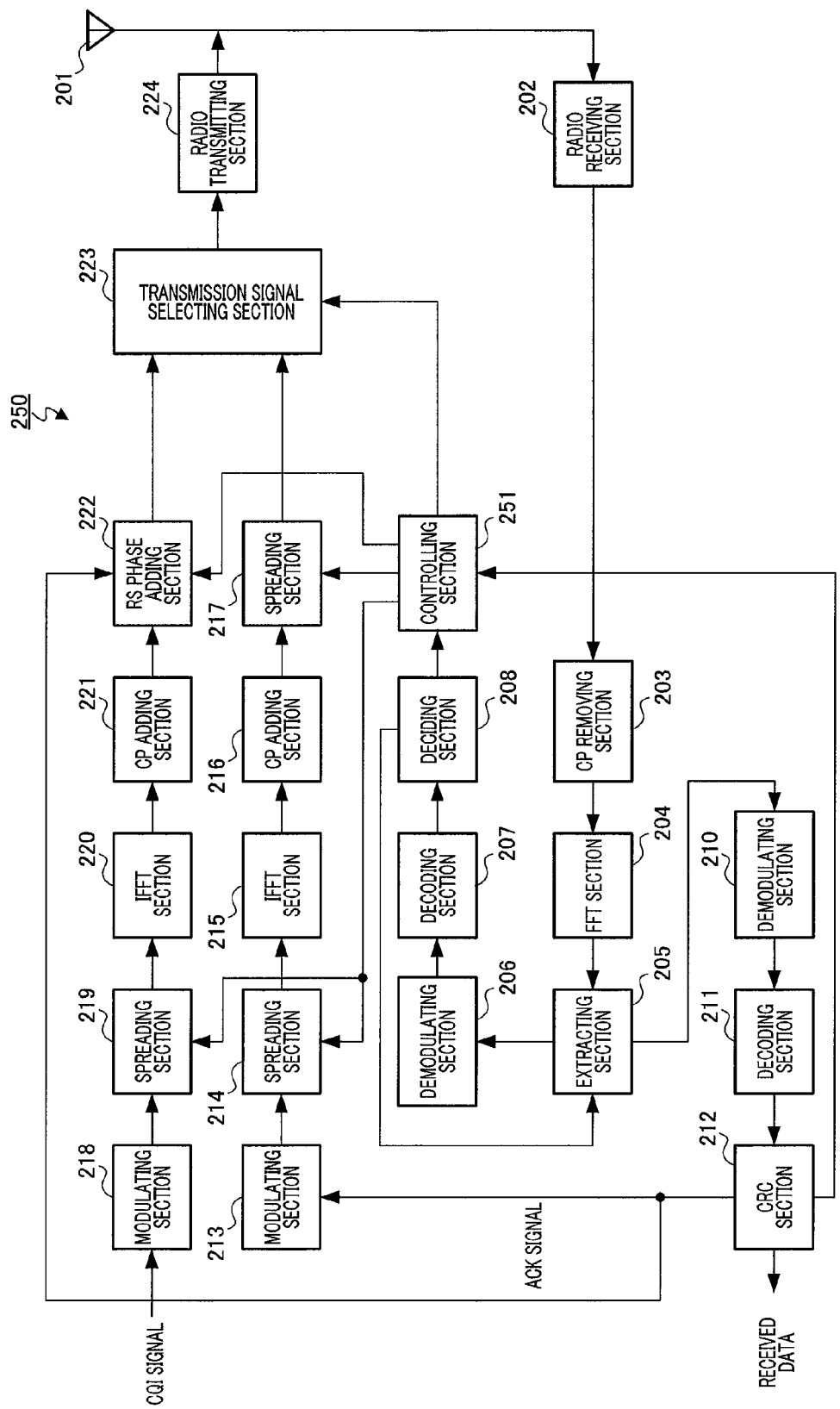
FIG. 15 is a block diagram showing a configuration of a mobile station according to Embodiment 3 of the present invention.

Next, FIG. 15 shows the configuration of mobile station 250 according to Embodiment 3 of the present invention. Note that FIG. 15 differs from FIG. 7 in changing controlling section 209 to controlling section 251.

According to the PUCCH number received as input from deciding section 208, controlling section 251 controls the cyclic shift amount of the ZC sequence used for first spreading in spreading section 214 and spreading section 219, and the Walsh sequence used for second spreading in spreading section 217. That is, controlling section 251 sets the ZC sequence of the cyclic shift amount associated with the PUCCH number received as input from deciding section 208, in spreading section 214 and spreading section 219, and sets the Walsh sequence associated with the PUCCH number received as input from deciding section 208, in spreading section 217. Further, controlling section 251 controls RS phase adding section 222 according to the RS phases received as input from deciding section 208.

Further, controlling section 251 controls transmission signal selecting section 223 to select transmission of a CQI signal, that is, transmission of an output from RS phase adding section 222, if base station 150 commands transmission of CQI in advance, and to select transmission of an ACK/NACK signal generated based on CRC=NG (i.e. error present) in deciding section 208, that is, transmission of an output from spreading section 217, if base station 150 does not command transmission of a CQI signal.

Furthermore, in case where base station 150 commands transmission of CQI in advance and the ACK/NACK signal needs to be transmitted with CQI at the same time, controlling section 251 determines the RS phases for RS phase adding section 222, according to the RS phases designated by base station 150 and the signal from CRC section 212. For example, in case where base station 150 designates in advance that (+, +) is CQI+ACK and (+, −) is CQI+NACK as the definition of the RS phases, and CQI and a NACK signal are transmitted at the same time, base station 150 commands RS phase adding section 222 to use the (+, −) phases.

Next, how mobile station 250 shown in FIG. 15 generates a CQI+response signal, will be explained. That is, a case will be explained where mobile station 250 transmits an ACK/NACK signal and a CQI signal at the same time.

Figure 16:
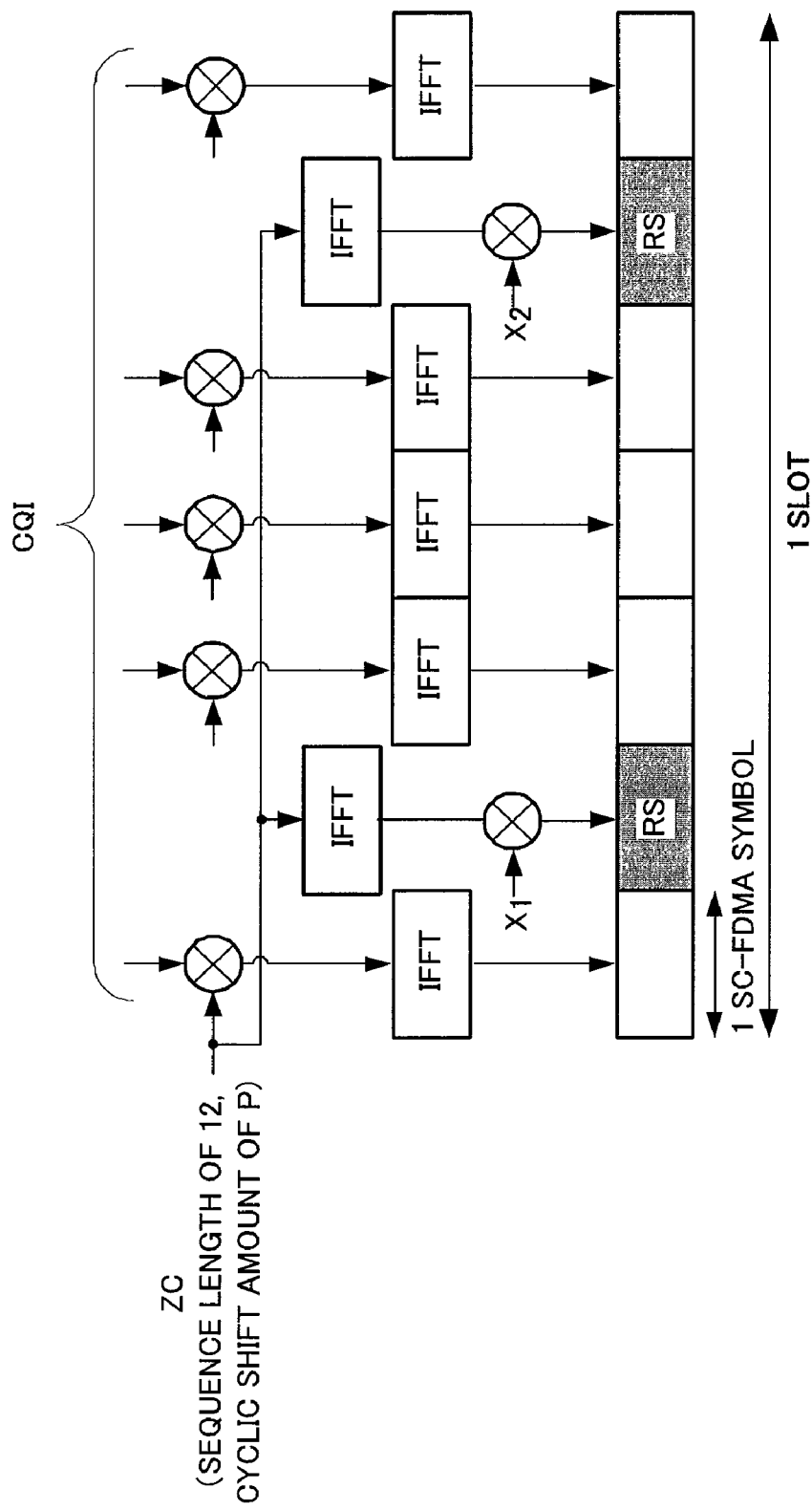
FIG. 16 shows how an ACK/NACK signal and a CQI signal that are transmitted at the same time are generated.

As shown in FIG. 15 and FIG. 16, five symbols of information in a CQI signal are spread using the ZC sequence in spreading section 219, added CPs by CP adding section 221 and mapped over five SC-FDMA symbols. Further, ZC sequences are mapped over two SC-FDMA symbols of the second symbol and sixth symbol as RSs.

Here, assume that base station 150 uses only two Walsh sequences determined in advance for ACK/NACK signal transmission. That is, although the system can utilize four Walsh sequences, base station 150 designates use of only two Walsh sequences W #0=[1,1,1,1] and W #1=[1,−1, −1,1]. Mobile station 250 transmitting only ACK/NACK signals uses only these Walsh sequences. Similarly, base station 150 broadcasts that, for the RS phases of CQI (i.e. the phase of the second symbol=$X_1$ and the phase of the sixth symbol=$X_2$), (+, +) is defined as CQI+ACK and (+, −) is defined as CQI+NACK. That is, as described above, RS phase adding section 222 of mobile station 250 in FIG. 15 that transmits a CQI+ response signal adds the RS phases of CQI. At this time, how an ACK/NACK signal and CQI signal are generated is as shown in FIG. 16.

As shown in FIG. 8, Walsh sequence W #1 is applied to data (corresponding to the outlined portion in the figure) of an ACK/NACK signal. By contrast with this, "+" is added to RSs of a CQI+NACK signal as the RS phase of the second symbol, and "−" is added to RSs of a CQI+NACK signal as the RS phase of the sixth symbol. That is, subsequences ($W_1$ and $W_2$) of the Walsh sequence applied to the second symbol and sixth symbol of the ACK/NACK signal multiplexed with the RSs of CQI show (+, +) or (−, −), the ACK/NACK signal does not produce interference to the result that is outputted by coordinating the phases (by inverting the reception result in the sixth symbol) assuming that the coefficients are (+, −) when RS combining section 152 of base station 150 decides the RSs of CQI. This is because correlation processing used to receive a CQI+NACK signal inverts the phases of the second symbol and sixth symbol of a signal spread using the Walsh sequence and the phases cancel each other, so that it is possible to reduce interference from the ACK/NACK signal to RSs of the CQI+NACK signal. That is, it is possible to reduce interference from surrounding individual ACK/NACK signals to CQI+NACK signals.

Note that the Walsh sequence and definition of RS phases of CQI in given base station 150 are broadcast from base station 150 at regular intervals.

In this way, according to Embodiment 3, by making RSs of a CQI+NACK signal transmitted from a mobile station orthogonal to second spreading codes of an ACK/NACK signal multiplexed in the same positions as these RSs and by, in base station 150, coordinating and averaging the RS phases of the CQI+NACK signal, the influence of noise can be reduced and interference from ACK/NACK signals transmitted from other mobile stations can be reduced, so that it is possible to improve the accuracy of deciding NACK signals when CQI+NACK signals are received.

In case where the base station fails to receive an ACK signal, the base station transmits a downlink signal again even though data has reached a terminal. However, in this case, only a little downlink resources are wasted, which does not influence the system significantly. However, in case where the base station fails to receive a NACK signal, the base station learns that the mobile station has successfully received data and does not retransmit data. Accordingly, in this case, required data does not reach the mobile station. In case where a mechanism is introduced to check the content of data in an upper layer and request data that has not reached the terminal, from the base station again, although the problem that data does not arrive does not occur, significant delay in data transmission occurs in case where the base station fails to receive a NACK signal. Therefore, according to the present embodiment, the efficiency of the system improves by improving the accuracy of deciding NACK signals when CQI+NACK signals are received.

Further, although a case has been explained with the present embodiment where two of four available Walsh sequences in the system are used, it is equally possible to determine the priority for four Walsh sequences in advance and sequentially use Walsh sequences from the highest priority. A case will be explained below where priority is assigned to four Walsh sequences.

Base station 150 broadcasts to all mobile stations 250 that each mobile station 250 must define the phases orthogonal to subsequences ($W_1$ and $W_2$) of the Walsh sequence that is frequently used, as CQI+NACK. The amount of interference to RSs of CQI+NACK increases depending on the number of mobile stations that use Walsh sequences that are not orthogonal to RSs of a CQI+NACK signal, it is possible to reduce the total amount of interference to the RSs of the CQI+NACK signal by making Walsh sequences that are frequently used and the RS phases of the CQI+NACK signals orthogonal to each other.

Further, even if base station 150 does not broadcast information related to the RS phases of the uplink CQI+NACK signal in advance, mobile station 250 may designate the definition of the RS phases of CQI+response signals every time depending on the timings to transmit CQI+response signals. Although which mobile station transmits an uplink signal in a given subframe or which uplink code resources are used to perform transmission in a mobile station changes on a per subframe basis, base station 150 has learned in advance which Walsh sequence is frequently used in a frame for transmitting a CQI+response signal, and, consequently, can command mobile stations to transmit RSs of CQI+NACK signals by making the RSs of the CQI+NACK signals and the Walsh sequence ($W_1$ and $W_2$) that is frequently used orthogonal to each other. By this means, it is possible to reduce the total amount of interference to the RSs of CQI+NACK signals.

Embodiment 4

The configurations of the base station and mobile station according to Embodiment 4 of the present invention are the same as the configurations shown in FIG. 14 and FIG. 15 according to Embodiment 3, and therefore will be explained employing FIG. 14 and FIG. 15.

Figure 17:
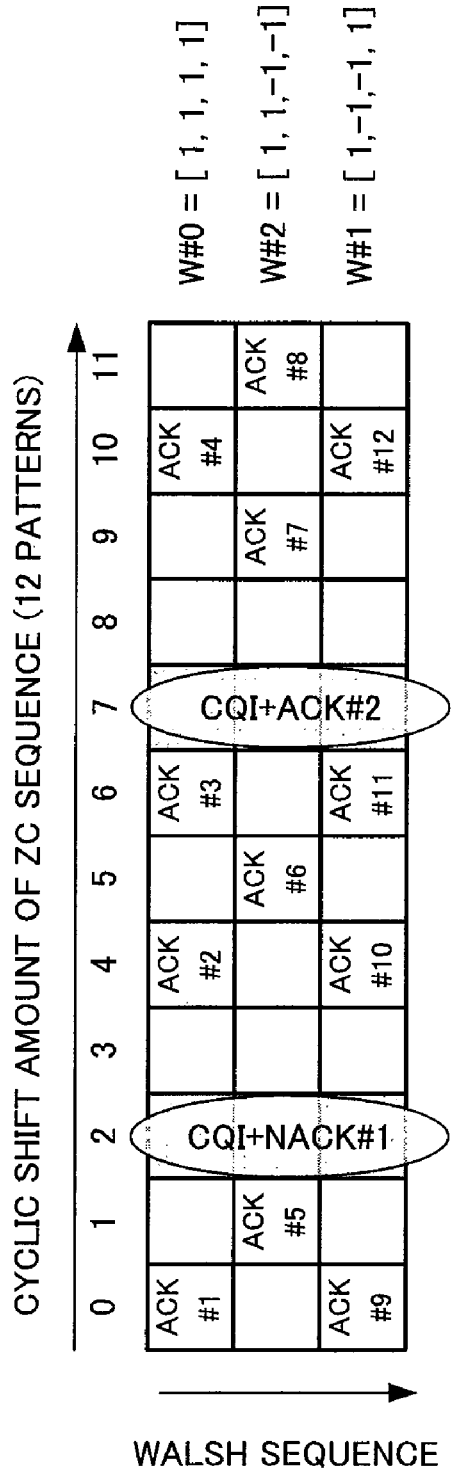
FIG. 17 shows how an ACK/NACK signal and a CQI+ response signal are multiplexed according to Embodiment 4 of the present invention.

How an ACK/NACK signal and CQI+response signal are multiplexed (i.e. resource allocation) according to Embodiment 4 of the present invention is shown in FIG. 17. Here, assume that base station 150 has performed resource allocation shown in FIG. 17. Note that the horizontal axis represents the cyclic shift amount and the vertical axis represents the Walsh sequence.

Further, note that the RSs of a CQI+response signal are mainly interfered from ACK/NACK signals spread using ZC sequences associated with consecutive cyclic shift amounts. To be more specific, RSs of a CQI+response signal receive significant interference from a nearby ACK/NACK signal of a small cyclic shift amount, and apply significant interference to a nearby ACK/NACK signal of a high cyclic shift amount.

As shown in FIG. 17, mobile station 250 that transmits CQI+NACK #1 spreads and transmits CQI+NACK #1 using the ZC sequence associated with cyclic shift amount of 2. At this time, CQI+NACK #1 receives the greatest interference from ACK #5 and, therefore, uplink RS phase determining section 151 of base station 150 determines (+, +) as the RS phases of CQI+NACK #1 focusing on the phases ($W_1$=1 and $W_2$=−1) of $W_1$ and $W_2$ of ACK #5.

Next, interference from CQI+response signals to neighboring ACK/NACK signals is taken into account. When a given mobile station transmits CQI and a response signal at the same time, response signals are ACK signals at the rate of 90 percent. This is because base station 150 performs adaptive modulation processing such that the transmission target error rate of downlink data becomes around 10 percent. That is, reducing interference from a CQI+ACK signal to neighboring ACK/NACK signals is effective to reduce interference from a CQI+response signal to neighboring ACK/NACK signals. Here, back to FIG. 17, CQI+ACK #2 is focused. CQI+ACK #2 applies significant interference to ACK #7. Focusing on the phases ($W_1$=−1 and $W_2$=1) of $W_1$ and $W_2$ of ACK #7, uplink RS phase determining section 151 of base station 150 determines (+, +) as the RS phases of CQI+ACK #2.

By this means, base station 150 performs despreading when ACK #7 is received and therefore reverse phases of RS portions of a CQI+ACK signal are added, so that it is possible to reduce interference signals from the RS portions of the CQI+AKC signal to ACK #7.

In this way, according to Embodiment 4, the RS phases of a CQI+response signal are determined focusing on Walsh codes of an ACK/NACK signal that actually receives and applies significant interference, so that it is possible to reduce the amount of interference that RSs of a CQI+response signal receives and the amount of interference that RSs of the CQI+response signal applies.

Embodiments have been explained above.

Further, although the above embodiments have been explained assuming that one base station forms one cell and the base station performs the same RS code control and ACK/NACK resource control in its managing area, the present invention is also applicable to a case where, for example, one base station forms a plurality of cells by means of directional antennas, manages a plurality of cells and controls these cells independently.

Also, although cases have been described with the above embodiments as examples where the present invention is configured by hardware, the present invention can also be realized by software.

Each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of a programmable FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosures of Japanese Patent Application No. 2007-211101, filed on Aug. 13, 2007 and Japanese Patent Application No. 2007-280797, filed on Oct. 29, 2007, including the specifications, drawings and abstracts, are incorporated herein by reference in their entirety.

INDUSTRIAL APPLICABILITY

The radio transmitting apparatus and radio transmitting method according to the present invention can improve CQI receiving performance, and are applicable to, for example, a wireless communication base station apparatus and wireless communication mobile station apparatus in, for example, a mobile communication system.

The invention claimed is:

1. A radio communication method comprising:
spreading an acknowledgement or non-acknowledgement (ACK/NACK) signal with an orthogonal sequence, which is selected from a plurality of orthogonal sequences, the plurality of orthogonal sequences including more orthogonal sequences that render two values respectively corresponding to Nth symbol and Mth symbol of an ACK/NACK signal transmission slot in phase, than orthogonal sequence(s) that render said two values in opposite phases from each other;
transmitting the spread ACK/NACK signal in the ACK/NACK signal transmission slot;
arranging two reference signals (RS), which are produced by multiplying two reference signal sequences with values having opposite phases from each other, in the Nth symbol and the Mth symbol of a CQI signals transmission slot, and arranging channel quality indicator (CQI) signals in symbols of the CQI signals transmission slot other than the Nth symbol and the Mth symbol; and
transmitting the reference signals (RS) and the CQI signals arranged in the CQI signals transmission slot.

2. The radio communication method according to claim 1, wherein
a physical resource, which supports a mixture of a format for transmitting an ACK/NACK signal and a format for transmitting CQI signals, is used to transmit the spread ACK/NACK signal in the ACK/NACK signal transmission slot or the reference signals (RS) and the CQI signals arranged in the CQI signals transmission slot.

3. The radio communication method according to claim 2, wherein
in said physical resource block, the format for transmitting an ACK/NACK signal is associated with a sequence defined by a first cyclic shift value and the format for transmitting CQI signals is associated with a sequence defined by a second cyclic shift value different from the first cyclic shift value.

4. The radio communication method according to claim 1, wherein
the plurality of orthogonal sequences include orthogonal sequences of [+1,+1, +1,+1] and [+1, −1, −1,+1] having a sequence length of 4 corresponding to 1st, 2nd, 6th and 7th symbols of 7 symbols included in the ACK/NACK signal transmission slot; and
the Nth symbol is the 2nd symbol and the Mth symbol is the 6th symbol.

5. The radio communication method according to claim 1, further comprising:
controlling the multiplication of the two reference signal sequences with values having opposite phases from each other based on a signal transmitted from a base station.

6. A radio communication method comprising:
spreading an acknowledgement or non-acknowledgement (ACK/NACK) signal with an orthogonal sequence, which is selected from a plurality of orthogonal sequences, the plurality of orthogonal sequences including more orthogonal sequences that render two values respectively corresponding to 2nd symbol and 6th symbol of an ACK/NACK signal transmission slot in phase, than orthogonal sequence(s) that render said two values in opposite phases from each other, each of the plurality of orthogonal sequences having a sequence length of 4 corresponding to 1st, 2nd, 6th and 7th symbols of 7 symbols included in the ACK/NACK signal transmission slot;
arranging the spread ACK/NACK signal in the 1st, 2nd, 6th and 7th symbols of the ACK/NACK signal transmission slot and arranging first reference signals (1st RS) in 3rd, 4th and 5th symbols of the ACK/NACK signal transmission slot;
transmitting the ACK/NACK signal and the first reference signals (1st RS) arranged in the ACK/NACK signal transmission slot;
arranging channel quality indicator (CQI) signals in 1st, 3rd, 4th, 5th and 7th symbols of a CQI signals transmission slot and arranging two second reference signals (2nd RS), which are produced by multiplying two reference signal sequences with values having opposite phases from each other, in 2nd and 6th symbols of the CQI signals transmission slot; and
transmitting the CQI signals and the second reference signals (2nd RS) arranged in the CQI signals transmission slot.

7. The radio communication method according to claim 6, wherein
a physical resource, which supports a mixture of a format for transmitting an ACK/NACK signal and a format for transmitting CQI signals, is used to transmit the ACK/NACK signal and the first reference signals (1st RS) arranged in the ACK/NACK signal transmission slot or the CQI signals and the second reference signals (2nd RS) arranged in the CQI signals transmission slot.

8. The radio communication method according to claim 7, wherein
in said physical resource block, the format for transmitting an ACK/NACK signal is associated with a sequence defined by a first cyclic shift value and the format for transmitting CQI signals is associated with a sequence defined by a second cyclic shift value different from the first cyclic shift value.

9. A radio communication apparatus comprising:
a spreading unit configured to spread an acknowledgement or non-acknowledgement (ACK/NACK) signal with an orthogonal sequence, which is selected from a plurality of orthogonal sequences, the plurality of orthogonal sequences including more orthogonal sequences that render two values respectively corresponding to Nth symbol and Mth symbol of an ACK/NACK signal transmission slot in phase, than orthogonal sequence(s) that render said two values in opposite phases from each other;

a transmitting unit configured to transmit the spread ACK/NACK signal in the ACK/NACK signal transmission slot;

an arranging unit configured to arrange two reference signals (RS), which are produced by multiplying two reference signal sequences with values having opposite phases from each other, in the Nth symbol and the Mth symbol of a CQI signals transmission slot, and to arrange channel quality indicator (CQI) signals in symbols of the CQI signals transmission slot other than the Nth symbol and the Mth symbol, wherein the transmitting unit is further configured to transmit the reference signals (RS) and the CQI signals arranged in the CQI signals transmission slot.

10. The radio communication apparatus according to claim 9, wherein the transmitting unit transmits the spread ACK/NACK signal in the ACK/NACK signal transmission slot or the reference signals (RS) and the CQI signals arranged in the CQI signals transmission slot using a physical resource that supports a mixture of a format for transmitting an ACK/NACK signal and a format for transmitting CQI signals.

11. The radio communication apparatus according to claim 10, wherein in the physical resource block, the format for transmitting an ACK/NACK signal is associated with a sequence defined by a first cyclic shift value and the format for transmitting CQI signals is associated with a sequence defined by a second cyclic shift value different from the first cyclic shift value.

12. The radio communication apparatus according to claim 9, wherein the plurality of orthogonal sequences include orthogonal sequences of [+1,+1, +1,+1] and [+1, −1, −1,+1] having a sequence length of 4 corresponding to 1st, 2nd, 6th and 7th symbols of 7 symbols included in the ACK/NACK signal transmission slot; and the Nth symbol is the 2nd symbol and the Mth symbols is the 6th symbol.

13. The radio communication apparatus according to claim 9, further comprising:

a controlling unit configured to control multiplication of the two reference signal sequences with values having opposite phases from each other based on a signal transmitted from a base station.

14. A radio communication apparatus comprising:

a spreading unit configured to spread an acknowledgement or non-acknowledgement (ACK/NACK) signal with an orthogonal sequence, which is selected from a plurality of orthogonal sequences, the plurality of orthogonal sequences including more orthogonal sequences that render two values respectively corresponding to 2nd symbol and 6th symbol of an ACK/NACK signal transmission slot in phase, than orthogonal sequence(s) that render said two values in opposite phases from each other, each of the plurality of orthogonal sequences having a sequence length of 4 corresponding to 1st, 2nd, 6th and 7th symbols of 7symbols included in the ACK/NACK signal transmission slot;

an arranging unit configured to arrange the spread ACK/NACK signal in the 1st, 2nd, 6th and 7th symbols of the ACK/NACK signal transmission slot and to arrange first reference signals (1st RS) in 3rd, 4th and5th symbols of the ACK/NACK signal transmission slot; and a transmitting unit configured to transmit the ACK/NACK signal and the first reference signals (1st RS) arranged in the ACK/NACK signal transmission slot, wherein the arranging unit is further configured to arrange channel quality indicator (CQI) signals in 1st, 3rd, 4th, 5th and7th symbols of a CQI signals transmission slot and to arrange two second reference signals (2nd RS), which are produced by multiplying two reference signal sequences with values having opposite phases from each other, in 2nd and 6th symbols of the CQI signals transmission slot, and the transmitting unit is further configured to transmit the CQI signals and the second reference signals (2nd RS) arranged in the CQI signals transmission slot.

15. The radio communication apparatus according to claim 14, wherein the transmitting unit transmits the ACK/NACK signal and the first reference signals (1st RS) arranged in the ACK/NACK signal transmission slot or the second reference signals (2nd RS) and the CQI signals arranged in the CQI signals transmission slot using a physical resource that supports a mixture of a format for transmitting an ACK/NACK signal and a format for transmitting CQI signals.

16. The radio communication apparatus according to claim 15, wherein in said physical resource block, the format for transmitting an ACK/NACK signal is associated with a sequence defined by a first cyclic shift value and the format for transmitting CQI signals is associated with a sequence defined by a second cyclic shift value different from the first cyclic shift value.

* * * * *